(12) United States Patent
Ikeda et al.

(10) Patent No.: US 9,268,303 B2
(45) Date of Patent: Feb. 23, 2016

(54) BEARING MEMBER, END MEMBER, PHOTOSENSITIVE DRUM UNIT, DEVELOPING ROLLER UNIT, PROCESS CARTRIDGE, INTERMEDIATE MEMBER, AND BEARING MEMBER BODY

(71) Applicant: MITSUBISHI CHEMICAL CORPORATION, Chiyoda-ku (JP)

(72) Inventors: Shuichi Ikeda, Odawara (JP); Shinichi Iijima, Glendale, CA (US)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/580,288

(22) Filed: Dec. 23, 2014

(65) Prior Publication Data

US 2015/0110522 A1    Apr. 23, 2015

Related U.S. Application Data

(63) Continuation of application No. PCT/JP2014/068489, filed on Jul. 10, 2014.

(30) Foreign Application Priority Data

Jul. 12, 2013    (JP) ................................ 2013-146354
Apr. 24, 2014   (JP) ................................ 2014-090277
Jun. 6, 2014    (JP) ................................ 2014-118089

(51) Int. Cl.
*G03G 21/16*    (2006.01)
*G03G 21/18*    (2006.01)
(Continued)

(52) U.S. Cl.
CPC ............... *G03G 21/186* (2013.01); *F16D 1/06* (2013.01); *G03G 15/00* (2013.01); *G03G 15/751* (2013.01); *G03G 21/18* (2013.01); *Y10T 403/7073* (2015.01)

(58) Field of Classification Search
CPC ....... G03G 21/186; G03G 15/751; F16D 1/06
See application file for complete search history.

(56) References Cited

U.S. PATENT DOCUMENTS

2009/0317129 A1 * 12/2009 Abe et al. ................. 399/111
2010/0034561 A1    2/2010 Batori et al.
(Continued)

FOREIGN PATENT DOCUMENTS

JP    H07-317794 A1    12/1995
JP    2010-026473 A1    2/2010
JP    2010-197893 A1    9/2010

OTHER PUBLICATIONS

International Search Report issued Aug. 19, 2014 for PCT/JP2014/068489 filed on Jul. 10, 2014 with English Translation of Categories.
(Continued)

*Primary Examiner* — David Bolduc
*Assistant Examiner* — Barnabas Fekete
(74) *Attorney, Agent, or Firm* — Oblon, McClelland, Maier & Neustadt, L.L.P.

(57) ABSTRACT

A bearing member is configured to be arranged in an end portion of a columnar rotary body, in which a shaft member is attached to the bearing member. The bearing member includes a body which includes a cylindrical body and a holding portion which is arranged inside the cylindrical body, and an intermediate member which is held by the holding portion of the body. The holding portion includes an intermediate member guide which guides the intermediate member so that the intermediate member rotates. The intermediate member includes a portion in which the shaft member is arranged.

10 Claims, 38 Drawing Sheets

(51) Int. Cl.
*G03G 15/00* (2006.01)
*F16D 1/06* (2006.01)

(56) References Cited

U.S. PATENT DOCUMENTS

| | | |
|---|---|---|
| 2010/0221036 A1 | 9/2010 | Hara et al. |
| 2011/0182619 A1 | 7/2011 | Batori et al. |
| 2013/0230337 A1 | 9/2013 | Batori et al. |
| 2013/0322923 A1 | 12/2013 | Ikeda |
| 2014/0086632 A1 | 3/2014 | Batori et al. |
| 2014/0086633 A1 | 3/2014 | Batori et al. |

OTHER PUBLICATIONS

Written Opinion issued Aug. 19, 2014 for PCT/JP2014/068489 filed on Jul. 10, 2014.
Japan Institute of Invention and Innovation, Journal of Technical Disclosure, Technical Disclosure No. 2010-502200, Issued Apr. 22, 2010 (with English Translation).

* cited by examiner (a)

(b)

(a)

(b)

(a)

(b)

(a)

(b)

(a)

(b)

(a)

(b)

(c)

BEARING MEMBER, END MEMBER, PHOTOSENSITIVE DRUM UNIT, DEVELOPING ROLLER UNIT, PROCESS CARTRIDGE, INTERMEDIATE MEMBER, AND BEARING MEMBER BODY

CROSS REFERENCE TO RELATED APPLICATIONS

The present application is a continuation of International Patent Application No. PCT/JP2014/068489, which was filed on Jul. 10, 2014 based on Japanese Patent Application No. 2013-146354, filed on Jul. 12, 2013, Japanese Patent Application No. 2014-090277, filed on Apr. 24, 2014, and Japanese Patent Application No. 2014-118089, filed on Jun. 6, 2014, the contents of which are incorporated herein by reference.

BACKGROUND OF THE INVENTION

1. Field of the Invention

The present invention relates to a process cartridge which is detachably included in an image forming apparatus such as a laser printer and a copy machine, a photosensitive drum unit which is included in the process cartridge, a developing roller unit, an end member which is attached to a columnar rotary body of the photosensitive drum unit or the developing roller unit, a bearing member which configures the end member, an intermediate member which is included in the bearing member, and a bearing member body.

2. Description of the Related Art

An image forming apparatus such as a laser printer and a copy machine includes a process cartridge which is provided to be attachable to and detachable from an image forming apparatus body (hereinafter, referred to as an "apparatus body").

The process cartridge is a member which forms contents which are to be shown, such as characters and figures, and which transfers these contents to a recording medium such as a paper sheet. More specifically, the process cartridge includes a photosensitive drum in which the contents to be transferred are formed. In addition, other various units for forming the contents which are to be transferred to the photosensitive drum are arranged together in the process cartridge. For example, these units include a developing roller unit, a charging roller unit, and a cleaning unit.

In a case of the process cartridge, the same process cartridge is attached to or detached from the apparatus body for maintenance purpose, or a new process cartridge is mounted on the apparatus body after the old process cartridge is detached from the apparatus body. Users of the image forming apparatus can carry out such attachment and detachment work of the process cartridge by themselves. Therefore, from this point of view, it is desirable that the attachment and detachment work be carried out as easily as possible.

However, a drive shaft of the apparatus body is configured so as to engage with the photosensitive drum included in the process cartridge directly or via other members. This causes the photosensitive drum to receive a rotation force from the drive shaft and to rotate. Therefore, in order to attach and detach the process cartridge to and from the apparatus body, on each occasion, it is necessary to carry out disengagement work (detachment) and re-engagement work (mounting) between the drive shaft of the apparatus body and the photosensitive drum.

Therefore, if the photosensitive drum (process cartridge) can be attached to and detached from the drive shaft by moving the photosensitive drum in a direction along an axis of the drive shaft of the apparatus body, it is possible to configure a relatively simple apparatus. However, in a viewpoint of downsizing of the image forming apparatus and ensured space arrangement required for the attachment and detachment work of the process cartridge, it is preferable that the process cartridge be detached from the apparatus body so as to be pulled out in a direction different from the direction along the axis of the drive shaft, or so as to be pushed in an opposite direction when being attached.

JP-A-2010-26473 discloses a configuration in which the process cartridge is attached to and detached from the apparatus body in the direction different from the direction along the axis of the drive shaft of the apparatus body. Specifically, a coupling member disclosed in JP-A-2010-26473 is attached to a drum flange (bearing member) so as to be swingable by being provided with a spherical portion. Therefore, a portion (rotation force receiving member) which is included in the coupling member and engages with the drive shaft of the apparatus body swings around the spherical portion, and can change an angle with respect to the axis of the photosensitive drum. This facilitates the attachment and detachment between the drive shaft of the apparatus body and the photosensitive drum.

In addition, according to the invention disclosed in JP-A-2010-26473, in a structure for connecting a swinging shaft member to the bearing member, a groove for introducing a rotation force transmission pin included in the shaft member to the bearing member is disposed on an inner peripheral side of the bearing member. This groove is formed so as to extend in a rotation direction. This groove facilitates the attachment of the rotation force transmission pin to the bearing member.

SUMMARY OF THE INVENTION

However, according to the inventions disclosed in JP-A-2010-26473 and Technical Report Publication No. 2010-502200, Japan Institute of Invention and Innovation, it is difficult to realize smooth attachment of the shaft member to the bearing member, smooth swing of the shaft member, and smooth attachment and detachment between the shaft member and the apparatus body. For example, specifically, each member needs to have high accuracy in order to fulfill a desired function. Consequently, uneven quality of the shaft member has a great influence on the function.

In addition, according to a structure of the coupling member and a drum flange (bearing member) holding the coupling member which is disclosed in JP-A-2010-26473, there is provided a structure in which the coupling member is swingable and the spherical portion is directly held by the drum flange. Accordingly, it is necessary to forcibly attach and detach the coupling member when the spherical portion is attached to the drum flange (bearing member). Then, the forcible attachment and detachment may cause damage to the shaft member. In this regard, there is a problem of poor workability, and the shaft member is disadvantageously affected when in reuse.

In contrast, according to a structure disclosed in Technical Report Publication No. 2010-502200, Japan Institute of Invention and Innovation, when the shaft member is swung, a tilting angle thereof is limited. Consequently, in some cases, a sufficient swing angle cannot be obtained. Therefore, the present invention is made in view of the above-described problems, and an object thereof is to provide a bearing member which can transmit a rotation force equivalent to that in the related art, which can be attached to and detached from an apparatus body, which is smoothly operated, and which is less likely to receive an influence from uneven quality of a shaft member. In addition, there are provided an end member, a photosensitive drum unit, a developing roller unit, a process cartridge, an intermediate member, and a bearing member body.

An aspect of the present invention provides a bearing member configured to be arranged in an end portion of a columnar rotary body, wherein a shaft member is attachable to the bearing member. The bearing member includes a body that includes a cylindrical body and a holding portion which is arranged inside the cylindrical body, and an intermediate member that is held by the holding portion of the body. The holding portion includes an intermediate member guide which guides the intermediate member so that the intermediate member rotates, and the intermediate member includes a portion in which the shaft member is arranged.

According to some aspects of the present invention, the swing in at least one direction is performed by the rotation of the intermediate member and the body. Therefore, a smooth pivotal movement (swing of the shaft member) is possible. In this case, the pivotal movement (swing of the shaft member) has no relationship with a form of the shaft member. Accordingly, even if the shaft member side has slightly uneven dimensions, it is possible to ensure sufficiently smooth swing. In addition, the limitation of the tilting angle is relieved when the shaft member swings. Therefore, it is possible to tilt the shaft member more greatly.

37B is a view for describing a scene where the intermediate member 460 swings inside the body 445.

Figure 38:
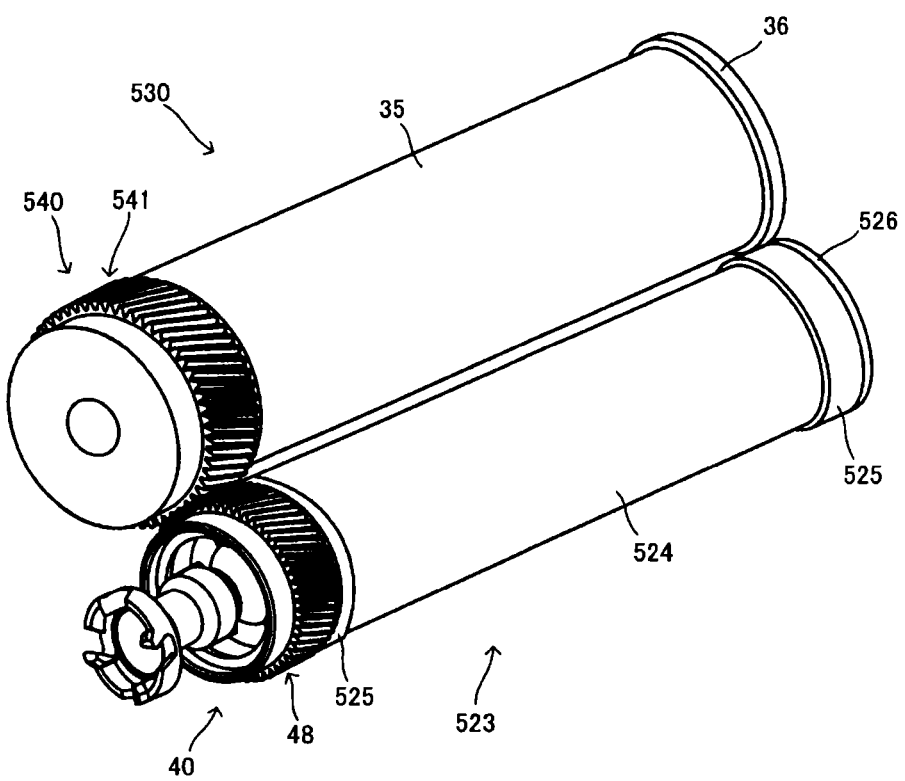

FIG. 38 is a view for describing a form where the end member 40 is included in a developing roller unit 523.

DETAILED DESCRIPTION OF THE EXEMPLARY EMBODIMENTS

Hereinafter, the present invention will be described with reference to embodiments illustrated in the drawings. However, the present invention is not limited to the embodiments. In addition, for ease of description, each drawing illustrates members by omitting or seeing through some members if necessary, or by using an exaggerated shape. In some cases, hatching is given on a surface serving as an end surface in cross-sectional views.

Figure 1:
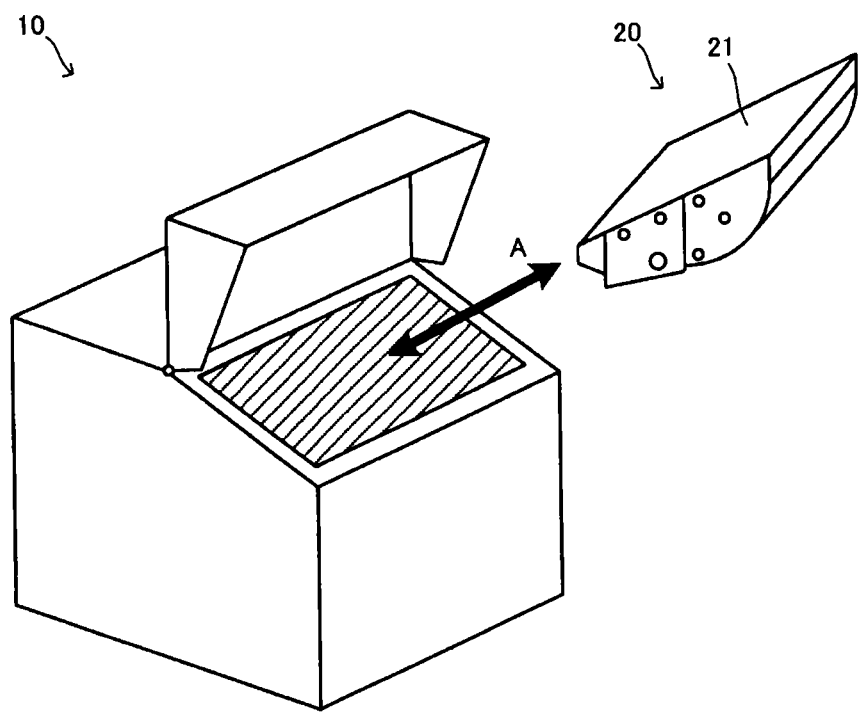
FIG. 1 is a conceptual view of an image forming apparatus body 10 and a process cartridge 20.

FIG. 1 is a diagram for describing a first embodiment, and is a perspective view schematically illustrating a process cartridge 20 which includes an end member 40 (refer to FIG. 2), and an image forming apparatus body 10 which is used by mounting the process cartridge 20 thereon (hereinafter, referred to as an "apparatus body 10"). As illustrated in FIG. 1, the process cartridge 20 can be mounted on the apparatus body 10 by being moved in a direction illustrated by arrow A in FIG. 1, and can be detached from the apparatus body 10. The direction of (A) is a direction different from an axial direction of a drive shaft of the apparatus body 10. The apparatus body 10 and the process cartridge 20 configure an image forming apparatus. Hereinafter, detailed description will follow.

Figure 2:
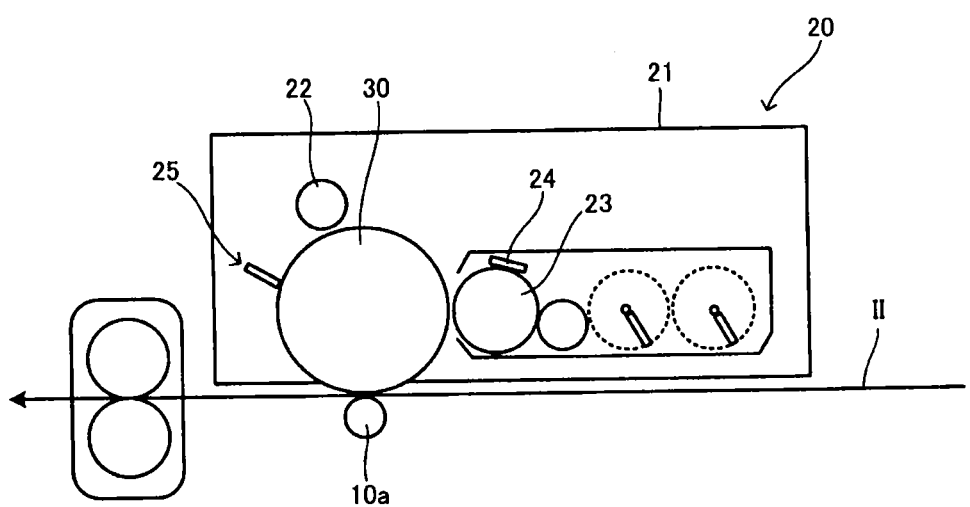
FIG. 2 is a diagram schematically illustrating a structure of the process cartridge 20.

FIG. 2 schematically illustrates a structure of the process cartridge 20. As is understood from FIG. 2, the process cartridge 20 is configured so that an inner side of a housing 21 internally accommodates a photosensitive drum unit 30 (refer to FIG. 3A), a charging roller unit 22, a developing roller unit 23, a regulating member 24, and a cleaning blade 25. In a posture where the process cartridge 20 is mounted on the apparatus body 10, a recording medium such as a paper sheet is moved along a line illustrated by II in FIG. 2. In this manner, an image is transferred onto the recording medium from the photosensitive drum unit 30.

In addition, attachment and detachment of the process cartridge 20 to and from the apparatus body 10 are performed roughly as follows. In the present embodiment, the photosensitive drum unit 30 included in the process cartridge 20 is rotated by receiving a rotation driving force from the apparatus body 10. Therefore, at least when operated, a drive shaft 11 (refer to FIG. 12A) of the apparatus body 10 and an end member 40 (refer to FIG. 3B) of the photosensitive drum unit 30 engage with each other. In this manner, the photosensitive drum unit 30 is in a state where the rotation force can be transmitted (refer to FIG. 12B).

In contrast, when the process cartridge 20 is attached to or detached from the apparatus body 10, the drive shaft 11 and the end member 40 need to quickly engage with each other or disengage from each other so as not to inhibit mutual movement to the other side or mutual rotation regardless of their postures. In this manner, the end member 40 of the photosensitive drum unit 30 properly engages with the drive shaft 11 of the apparatus body 10, thereby transmitting the rotation driving force.

Hereinafter, each configuration will be described.

As is understood from FIG. 2, the process cartridge 20 includes the charging roller unit 22, the developing roller unit 23, the regulating member 24, the cleaning blade 25, and the photosensitive drum unit 30. These elements are internally accommodated inside the housing 21. The respective elements are configured as follows.

The charging roller unit 22 charges a photosensitive drum 35 (refer to FIG. 3A) of the photosensitive drum unit 30 by using a voltage applied from the apparatus body 10. The charging roller unit 22 is rotated to follow the photosensitive drum 35, and comes into contact with an outer peripheral surface of the photosensitive drum 35, thereby performing this charging.

The developing roller unit 23 is a member including a roller for supplying a developer to the photosensitive drum 35. Then, an electrostatic latent image formed in the photosensitive drum 35 is developed by the developing roller unit 23. A fixed magnet is embedded in the developing roller unit 23.

The regulating member 24 is a member which adjusts an amount of the developer adhering to an outer peripheral surface of the developing roller unit 23 and applies a frictional electrostatic charge to the developer itself.

The cleaning blade 25 is a blade which removes the developer remaining after the transfer by coming into contact with the outer peripheral surface of the photosensitive drum 35 and by using a distal end thereof.

Figure 3A:
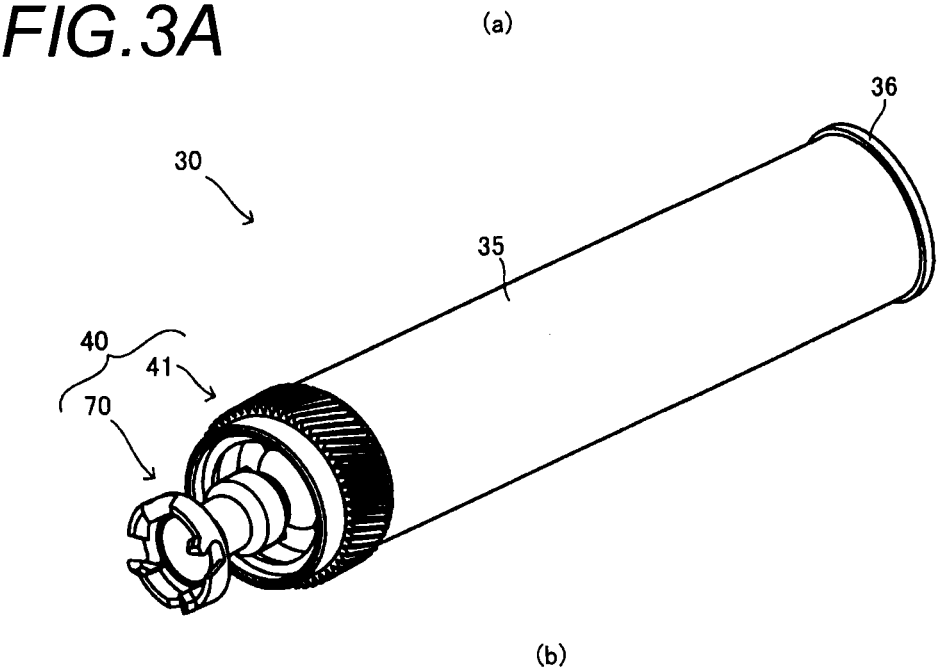
FIG. 3A is an external perspective view of a photosensitive drum unit 30 for describing a first embodiment.
Figure 3B:
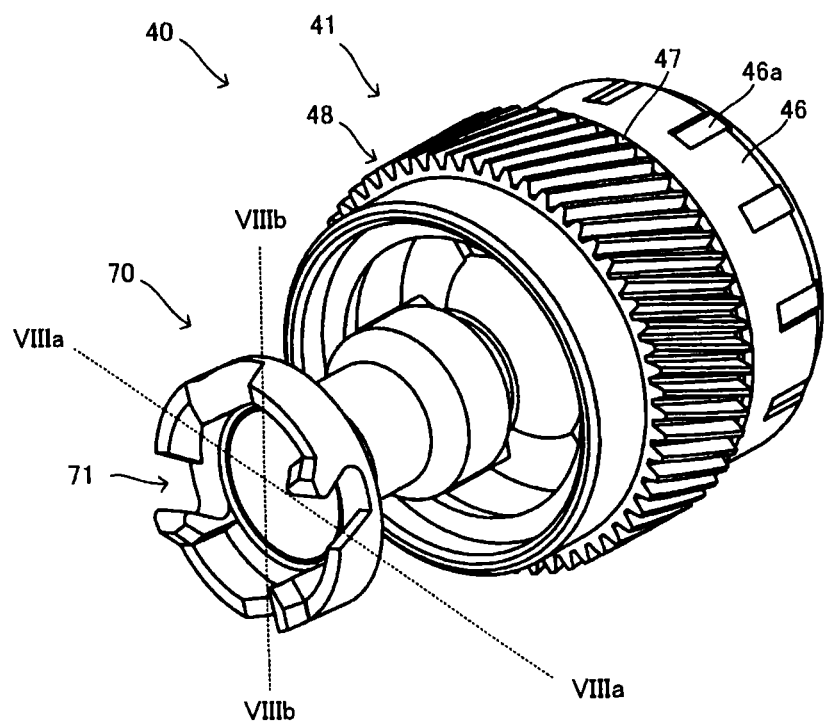
FIG. 3B is an external perspective view of an end member 40.

The photosensitive drum unit 30 is a member whose surface has characters or figures which are to be transferred to a recording medium such as a paper sheet. FIG. 3A illustrates an external perspective view of the photosensitive drum unit 30. As is understood from FIG. 3A, the photosensitive drum unit 30 includes the photosensitive drum 35, a lid member 36, and the end member 40. FIG. 3B illustrates a perspective view focusing on the end member 40. Hereinafter, the photosensitive drum unit 30 will be described with reference to FIGS. 2A and 2B and appropriate drawings.

The photosensitive drum 35 is a member in which an outer peripheral surface of a drum cylinder (sometimes referred to as a "substrate") serving as a columnar rotary body is coated with a photosensitive layer. That is, the drum cylinder is a conductive cylinder made of aluminum, and is configured so that the cylinder is coated with the photosensitive layer. As will be described later, the end member 40 is attached to one end of the photosensitive drum 35, and the lid member 36 is arranged in the other end. In the present embodiment, the drum cylinder is configured to have a cylindrical hollow shape, but may be configured to have a solid round bar shape. However, at least the lid member 36 and the end member 40 are formed so as to be properly attached to an end portion thereof.

The lid member 36 is a member formed of a resin, in which a fitting portion fitted to an inside of a cylinder of the photosensitive drum 35 and a bearing portion arranged to cover one end surface of the photosensitive drum 35 are formed coaxially. The bearing portion has a disk shape covering the end surface of the photosensitive drum 35, and includes a portion for receiving a shaft disposed inside the process cartridge. In addition, a ground plate formed of a conductive material is arranged in the lid member 36, thereby electrically connecting the photosensitive drum 35 and the apparatus body 10 to each other.

Without being limited to this lid member described as an example of the present embodiment, other types of lid members which are generally available can also be adopted. For example, a gear for transmitting the rotation force may be arranged in the lid member. In addition, the above-described conductive material may be disposed on the end member 40 side (to be described later).

The end member 40 is a member attached to an end portion opposite to the above-described lid member 36 within an end portion of the photosensitive drum 35, and includes a bearing member 41 and a shaft member 70.

Figure 4:
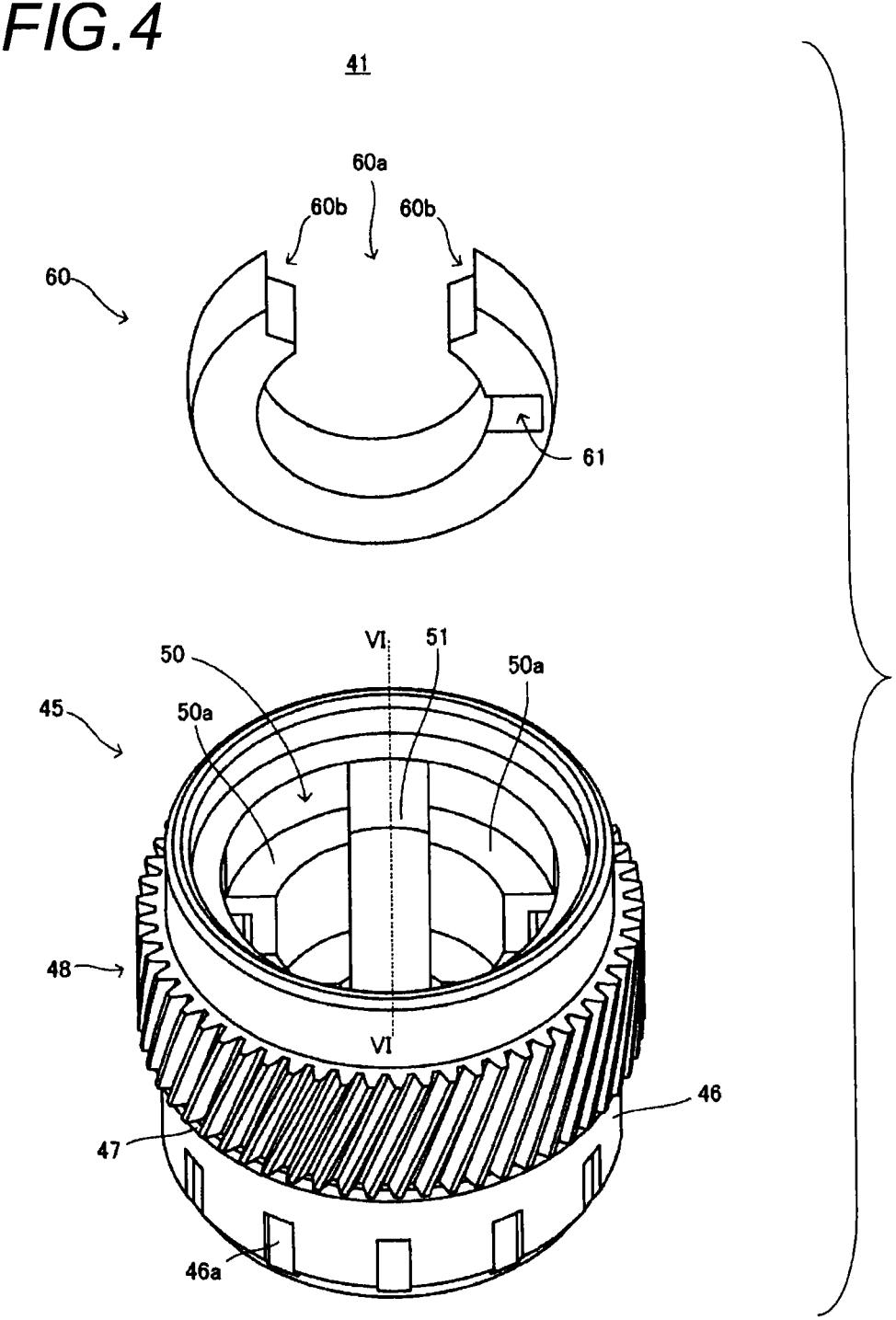
FIG. 4 is an exploded perspective view of a bearing member 41.

The bearing member 41 is a member which is fixed to the end portion of the photosensitive drum 35. FIG. 4 illustrates an exploded perspective view of the bearing member 41. As is understood from FIG. 4, the bearing member 41 includes a body 45 and an intermediate member 60. Each of these will be described.

Figure 5A:
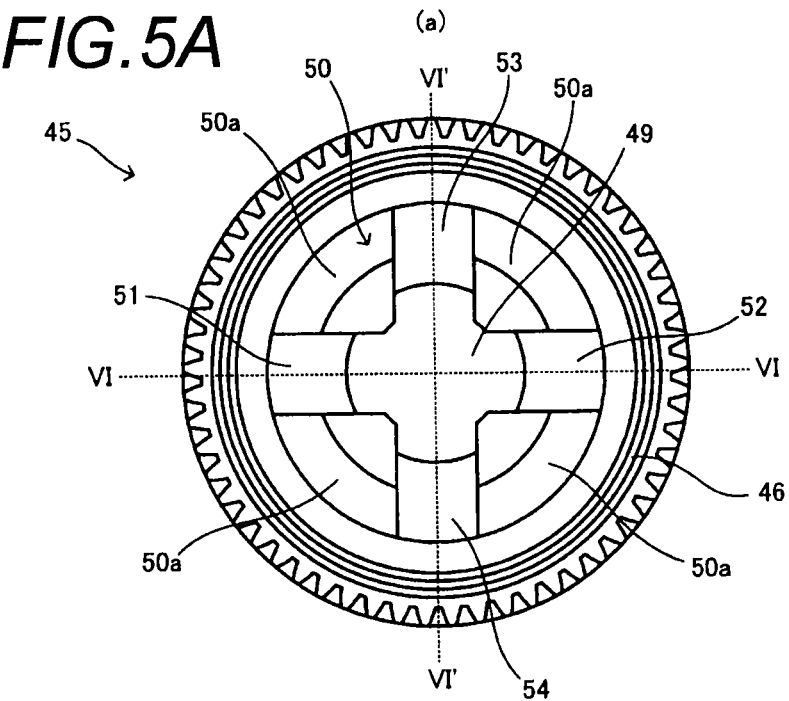
FIG. 5A is a plan view of a body 45 of the bearing member 41.
Figure 5B:
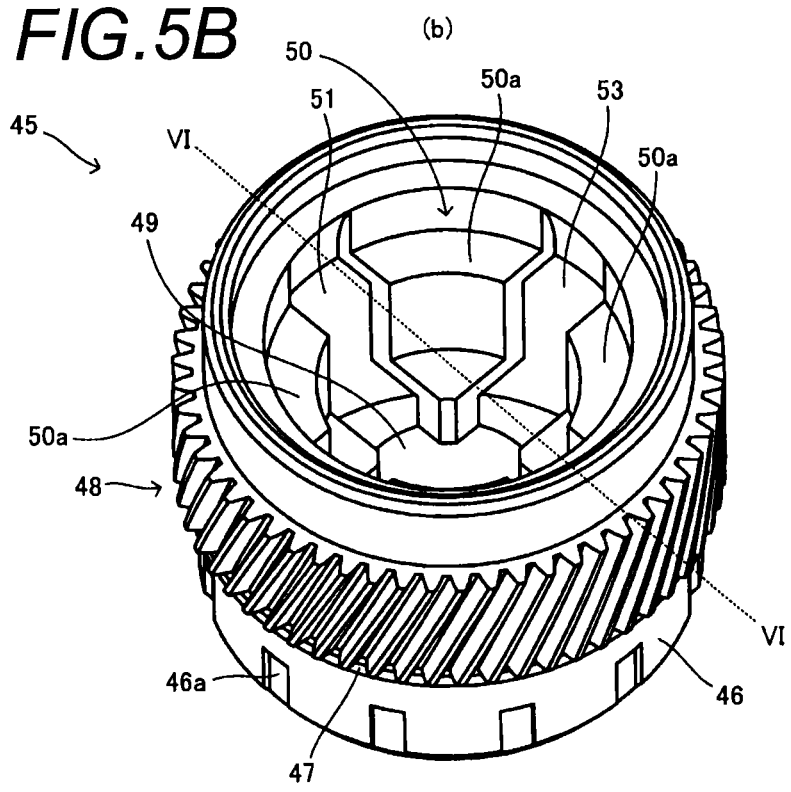
FIG. 5B is a perspective view of the body 45 of the bearing member 41.
Figure 6:
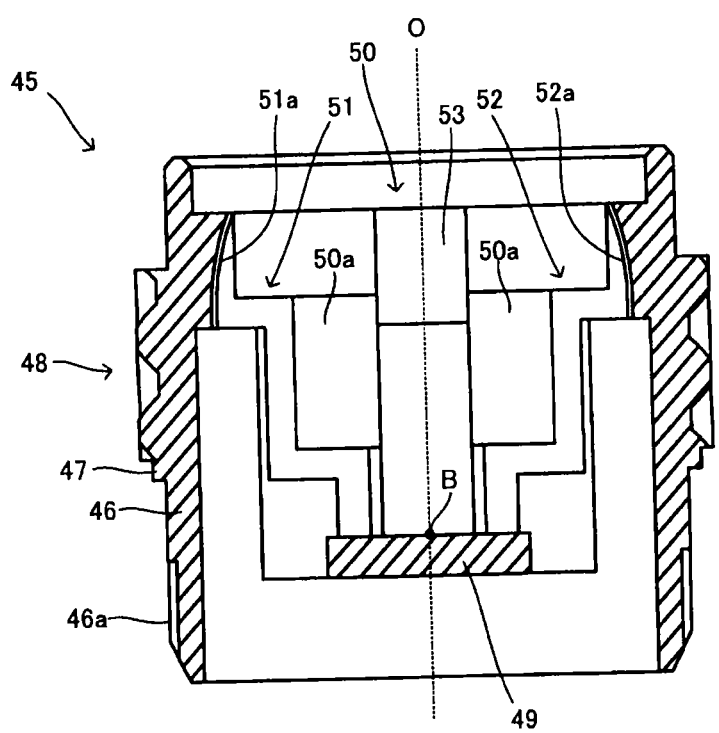
FIG. 6 is a cross-sectional view of the body 45 of the bearing member 41.

FIG. 5A illustrates a view when the body 45 is viewed from a side to which the intermediate member 60 is inserted, and FIG. 5B illustrates a view when the body 45 is viewed from a different angle from that in FIG. 3B, respectively. In addition, FIG. 6 illustrates a cross-sectional view taken in an axial direction along a line illustrated by VI-VI in FIGS. 4, 5A, and 5B. In the body 45 according to the present embodiment, a cross section in the axial direction along a line (line illustrated by VI'-VI' in FIG. 5A) in which the line illustrated by VI-VI is rotated by 90° around the axis of the body 45 is the same as that in FIG. 6.

In the present embodiment, the body 45 includes a cylindrical body 46 having a cylindrical shape as is understood in FIGS. 3 to 6. In addition, an outer peripheral surface of the cylindrical body 46 has a ring-shaped contact wall 47 erected along the outer peripheral surface, and a gear 48.

An outer diameter of the cylindrical body 46 is substantially the same as an inner diameter of the above-described photosensitive drum 35. One end side of the cylindrical body 46 is inserted into and fitted to the photosensitive drum 35, thereby fixing the body 45 to the photosensitive drum 35. In this case, the cylindrical body 46 is inserted to a depth which allows the end surface of the photosensitive drum 35 to come into contact with the contact wall 47. In this case, an adhesive may be used for more strengthened fixing. In addition, a groove 46a or concave and convex portions may be disposed in the cylindrical body 46 of a portion in which the adhesive is arranged. This causes the adhesive to be held in the groove 46a or the concave portion, thereby further strengthening adhesion between the photosensitive drum 35 and the body 45.

The gear 48 is a gear for transmitting the rotation force to the developing roller unit 23, and is a helical gear in the present embodiment. Without being particularly limited thereto, a type of the gear may be a spur gear. However, the gear may not be necessarily disposed.

A plate-shaped bottom portion 49 is disposed on a cylindrical inner side of the cylindrical body 46 so as to close at least a portion of the inner side of the cylindrical body 46. Furthermore, within the inner side of the cylindrical body 46 which is partitioned by the bottom portion 49, a holding portion 50 is disposed on an inner side opposite to a side which is fixed to the photosensitive drum 35.

Here, an example including the bottom portion 49 has been described, but the bottom portion 49 may not be necessarily disposed. As will be described later, the shaft member 70 and the intermediate member 60 can be held by the holding portion 50. Accordingly, without disposing the bottom portion 49, it is possible to hold the shaft member 70 and the intermediate member 60 inside the cylindrical body 46.

The holding portion 50 forms guide grooves 51, 52, 53, and 54 which serve as an intermediate member guide, inside the cylindrical body 46. Therefore, in the holding portion 50, multiple projections 50a are arranged at predetermined gaps along an inner peripheral surface of the cylindrical body 46 so as to project from an inner surface of the cylindrical body 46 toward the axis of the cylindrical body 46. The gaps between the adjacent projections 50a form the guide grooves 51, 52, 53, and 54. In addition, a space (concave portion) is formed in the axis portion surrounded by the projections 50a, and a proximal end portion (spherical body 90, refer to FIGS. 8A and 8B) of the shaft member 70 is arranged therein as described herein.

Here, in the guide grooves, two guide grooves opposing each other across the axis of the cylindrical body 46 function as a pair. Then, the guide groove may actually be used as one pair as will be described later. However, as in the present embodiment, four guide grooves 51, 52, 53, and 54, that is, two pairs may be disposed. Furthermore, six (three pairs) or more guide grooves may be disposed. This can improve the balance of material behavior (sink mark) when the body 45 is injection-molded, and can manufacture a more accurate body. Therefore, the number of guide grooves may be determined in terms of the material behavior.

Herein, a pair of guide grooves configured to have the guide grooves 51 and 52 whose cross-sections are illustrated in FIG. 6 will be described. Another pair of guide grooves configured to have the guide grooves 53 and 54 is the same as the above-described pair, and thus, description thereof will be omitted.

As described above, the guide groove 51 is a groove which extends along a direction of the axis (illustrated by line O in FIG. 6) of the cylindrical body 46 formed on an inner peripheral surface of the cylindrical body 46. Then, the guide groove 51 is configured so that the axis O side of the cylindrical body 46 is open, and has a bottom surface on an inner peripheral surface side of the cylindrical body 46. In contrast, the guide groove 52 is a groove disposed so as to oppose the guide groove 51 on the opposite side across the axis O of the cylindrical body 46. Similar to the guide groove 51, the guide groove 52 is formed on the inner peripheral surface of the cylindrical body 46, and extends along the direction of the axis O of the cylindrical body 46. Then, the guide groove 52 is also configured so that the axis O side of the cylindrical body 46 is open, and has a bottom surface on an inner peripheral surface side of the cylindrical body 46.

In addition, as is understood from FIG. 6, at least a portion of the bottom surfaces of the guide grooves 51 and 52 have curved surfaces 51a and 52a which are curved with respect to a direction along the axis O of the cylindrical body 46. It is preferable that the curved surfaces 51a and 52a be configured as follows in a cross section illustrated in FIG. 6.

The curved surfaces 51a and 52a are disposed to oppose each other so as to be line-symmetrical across the axis O of the cylindrical body 46, and a gap between the curved surfaces 51a and 52a is narrowed as the curved surfaces 51a and 52a are away from the bottom portion 49 side (side inserted into the photosensitive drum 35). In this manner, it is preferable to form the curved surfaces to be close to each other. As will be described later, this can hold the intermediate member 60 so as not to be detached from the body 45.

It is preferable that the curved surfaces 51a and 52a have an arc shape and belong to the same circle, and that the center of the circle be located on the axis O. This can hold the intermediate member 60 in the body 45 in the direction along the axis O without looseness. Accordingly, it is possible to swing (tilt) the shaft member 70 by smoothly guiding the rotation of the intermediate member 60.

In addition, when the bottom portion 49 is provided, the bottom portion 49 may be arranged on the circumference of the circle to which the curved surfaces 51a and 52a belong so that an intersection point (point illustrated by B in FIG. 6) with a surface on the curved surfaces 51a and 52a side is present between the axis O and the bottom portion 49 of the cylindrical body 46.

A material configuring the body 45 is not particularly limited, but it is possible to use a resin such as polyacetal, polycarbonate, or PPS. Here, in order to improve rigidity of the member, glass fibers or carbon fibers may be mixed with the resin, depending on load torques. In addition, in order to obtain a smooth swing operation when the intermediate member 60 is attached to the body 45, sliding performance may be improved by causing the resin to contain at least one type among fluorine, polyethylene, and silicone rubber. In addition, the resin may be coated with fluorine, or lubricant may be applied to the resin.

Figure 7A:
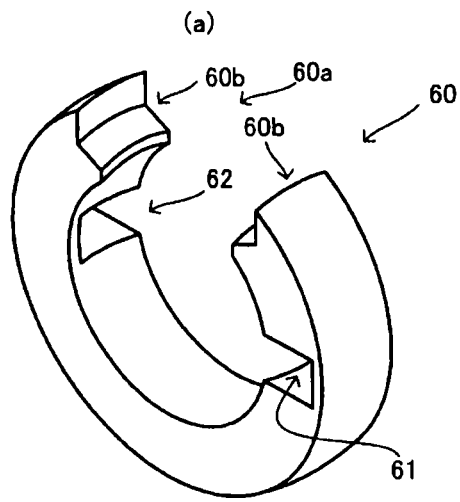
FIG. 7A is a perspective view of an intermediate member 60.
Figure 7B:
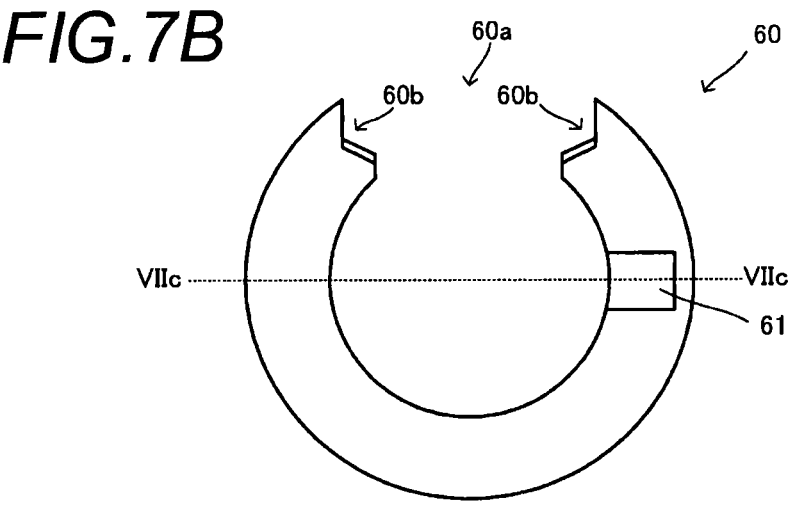
FIG. 7B is a front view of the intermediate member 60.
Figure 7C:
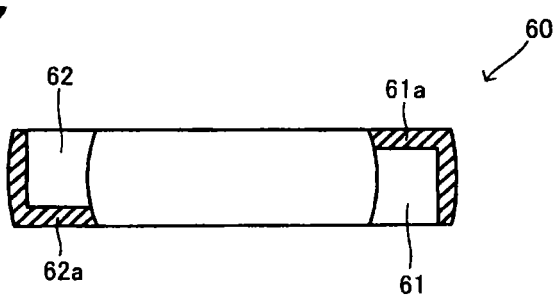
FIG. 7C is a cross-sectional view of the intermediate member 60.

Referring back to FIG. 4, the intermediate member 60 will be described. As is understood from FIG. 4, the intermediate member 60 is an annular member which is partially cut out. FIGS. 7A and 7B illustrate the intermediate member 60. FIG. 7A is a perspective view, FIG. 7B is a front view, and FIG. 7C is a cross-sectional view taken along a line illustrated by VIIc-VIIc in FIG. 7B.

The intermediate member 60 has an annular shape in which a cutout portion 60a is partially disposed.

In the intermediate member 60, a portion on an outer periphery thereof functions as a guided portion by being inserted into the inner side of a pair of grooves among the guide grooves 51, 52, 53, and 54 which are included in the holding portion 50 of the above-described body 45. Therefore, the outer diameter of the intermediate member 60 has a size which enables the intermediate member 60 to slide therein by being accommodated inside the pair of guide grooves in which the outer peripheral portion of the intermediate member 60 is arranged. When at least a portion of the bottom surface of the guide grooves 51, 52, 53, and 54 has an arc shape as described above, and when the arc belongs to the same circle in the pair of opposing guide grooves, it is preferable that the diameter of the circle be the same as the outer diameter of the intermediate member 60. This enables the intermediate member 60 to be smoothly and rotated between the guide grooves, and can suppress the looseness.

In contrast, the proximal end portion of the shaft member 70 (to be described later) is arranged on an annular inner side of the intermediate member 60. Accordingly, the annular inner side may have a size and a form which can accommodate at least a portion of the proximal end portion inside the intermediate member 60. In the present embodiment, the proximal end portion of the shaft member 70 is a spherical body 90 (refer to FIGS. 8A and 8B). Accordingly, the inner diameter of the intermediate member 60 can be configured to be the same as the diameter of the spherical body 90. In addition, as is understood from FIG. 7C, the inner peripheral surface of the intermediate member 60 is also curved in an arc shape in a direction along the axis of the ring (vertical direction on a paper surface in FIG. 7C). The curve can match the curve on the outer periphery of the spherical body 90. This enables the intermediate member 60 and the spherical body 90 to be more suitably combined with each other.

Then, the size (that is, thickness) in the direction along the axis of the ring of the intermediate member 60 is substantially the same as the width of the guide grooves 51 and 52 which are formed in the holding portion 50 of the above-described body 45.

The cutout portion 60a of the intermediate member 60 has a size and a shape in which at least a portion of a rotary shaft 85 (refer to FIGS. 8A and 8B) of at least the shaft member 70 (to be described later) can be arranged thereinside. Therefore, an end surface 60b of the intermediate member 60 in which the cutout portion 60a is formed can also match the shape of the rotary shaft 85. In the present embodiment, an enlarged diameter portion 85a is disposed in the rotary shaft 85, and a tapered portion is disposed herein (refer to FIGS. 8A and 8B). Accordingly, the end surface 60b of the intermediate member 60 is formed so as to have a valley in a V-shape which can receive the tapered portion.

Two grooves 61 and 62 extending outward from an inner peripheral surface of the ring are disposed in the intermediate member 60. The two grooves 61 and 62 are disposed at positions opposing each other along a diameter of the intermediate member 60. Both ends of a rotation force transmission pin 95 (refer to FIGS. 8A and 8B) of the shaft member 70 (to be described later) are respectively inserted into the grooves 61 and 62. Therefore, a shape and arrangement of the grooves 61 and 62 are configured so that the end portions of the rotation force transmission pin 95 can be respectively inserted into the grooves 61 and 62.

In addition, it is preferable that pieces 61a and 62a remain in one of the grooves 61 and 62 in the axis direction of the ring of the intermediate member 60, and that the grooves 61 and 62 do not penetrate in the direction along the axis. In this manner, when the shaft member 70 is assembled to the intermediate member 60 and the rotation force is applied to the shaft member 70 from the apparatus body 10, the rotation force transmission pin 95 is caught on by the pieces 61a and 62a so that the rotation fore can be properly transmitted to the intermediate member 60. Therefore, in view of the rotation of the rotation force transmission pin 95, as is well understood from FIGS. 7A to 7C, the piece 61a of the groove 61 and the piece 62a of the groove 62 are disposed on different sides in the axial direction of the intermediate member 60.

If a distal end of the rotation force transmission pin 95 extends to reach the inside of the guide grooves 51 and 52 of the holding portion 50 of the body 45, the distal end of the rotation force transmission pin 95 is caught on by a lateral wall of the guide grooves 51 and 52 when rotated. Accordingly, since the rotation force can be transmitted, the pieces 61a and 62a may not be necessarily disposed.

In addition, an opening portion opposing the pieces 61a and 62a within the grooves 61 and 62 may be slightly narrowed as compared to the inside of the groove. Specifically, the opening portion can be configured to have an opening which is slightly smaller than a diameter of the rotation force transmission pin 95. In this manner, the rotation force transmission pin 95 which has entered the inside of the grooves 61 and 62 once is less likely to slip out from the grooves 61 and 62 by the narrowed opening portion.

A material configuring the intermediate member 60 is not particularly limited, but it is possible to use a resin such as polyacetal, polycarbonate, and PPS. Here, in order to improve rigidity of the member, glass fibers or carbon fibers may be mixed with the resin, depending on load torques. In addition, in order to obtain a smooth swing operation when the intermediate member 60 is attached to the body 45, sliding performance may be improved by causing the resin to contain at least one type among fluorine, polyethylene, and silicone rubber. In addition, the resin may be coated with fluorine, or lubricant may be applied to the resin.

Figure 8A:
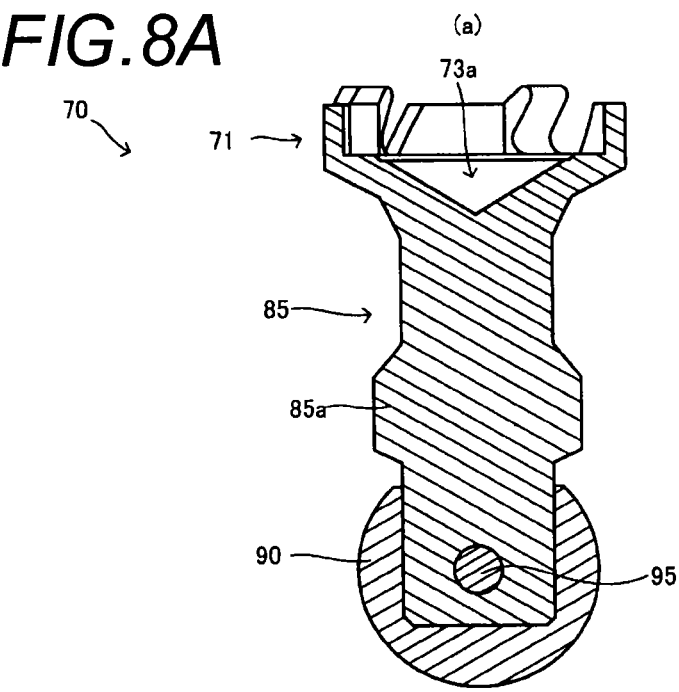
FIG. 8A is a cross-sectional view of a shaft member 70.
Figure 8B:
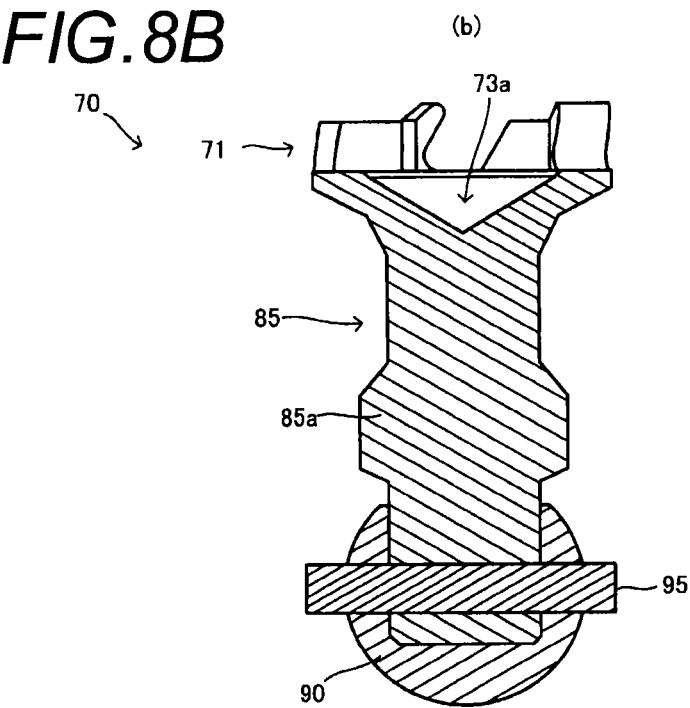
FIG. 8B is another cross-sectional view of the shaft member 70.

Referring back to FIGS. 3A and 3B, the shaft member 70 within the end member 40 will be described. FIG. 8A illustrates a cross-sectional view taken along VIIIa-VIIIa of the shaft member 70 illustrated in FIG. 3B, and FIG. 8B illustrates a cross-sectional view taken along VIIIb-VIIIb of the shaft member 70 illustrated in FIG. 3B, respectively. Two cross sections are shifted by 90° around the axis. As is understood from FIGS. 3B, 8A, and 8B, the shaft member 70 includes a coupling member 71, the rotary shaft 85, the spherical body 90, and the rotation force transmission pin 95.

Figure 9:
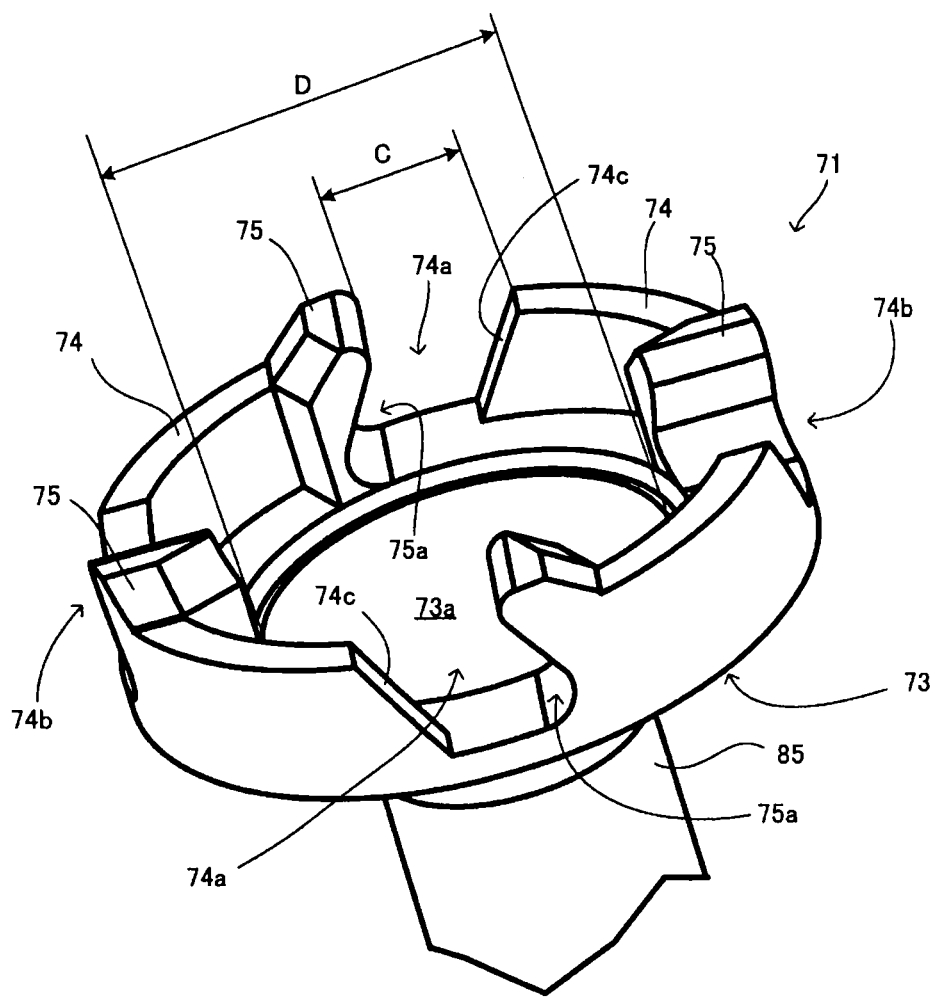
FIG. 9 is an enlarged view of a coupling member 71.

The coupling member 71 is a portion which functions as a rotation force receiving portion for receiving the rotation driving force from the apparatus body 10 (refer to FIG. 1). FIG. 9 illustrates an enlarged view of the coupling member 71. As is understood from FIGS. 3B, 8A, 8B, and 9, the coupling member 71 is a circular dish-shaped member, and an inside thereof has a bottom portion 73 in which a conical concave portion 73a is disposed so that a portion through which the axis passes is the deepest.

In addition, a cylindrical engagement wall 74 is erected along an edge of a surface on one surface side (opposite side to the side having the rotary shaft 85) within surfaces of the bottom portion 73. Two pairs of grooves 74a and 74b which oppose each other across the axis of the shaft member 70 are disposed on the engagement wall 74. One pair of the grooves 74a and the other pair of the grooves 74b are shifted by 90° around the axis.

As clearly illustrated in FIG. 9, a convex portion 75 is disposed on one lateral wall of the groove in the respective grooves 74a and 74b, and the bottom portion 73 side thereof is provided with a recess 75a in the circumferential direction. In this manner, as will be described later, a pin 11b of the drive shaft 11 of the apparatus body 10 engages with the recess 75a. Accordingly, the pin 11b is prevented from slipping out, and the rotation force is properly transmitted (refer to FIG. 12B).

In addition, a tilted surface 74c is formed on the other side lateral wall of the respective grooves 74a and 74b, thereby facilitating introduction of the above-described pin 11b into the groove.

Therefore, a width of the groove 74a illustrated by C in FIG. 9 is slightly larger than a diameter of the pin 11b (refer to FIG. 12B), and is narrower than a diameter of a shaft portion 11a so that the shaft portion 11a of the drive shaft 11 cannot pass therethrough. An inner side diameter of the engagement wall 74 which is illustrated by D in FIG. 9 is formed to be slightly larger than the diameter of the shaft portion 11a of the drive shaft 11, but is approximately the same. How the rotation force can be received from the drive shaft 11 will be described later.

The present embodiment employs four (two pairs) grooves on the engagement wall, but the number is not particularly limited thereto. Two (one pair), six (three pairs) or more grooves may be employed. In addition, a form of the coupling member 71 has been specifically described as an example, but the present embodiment is not necessarily limited to the form. Any shape may be employed as long as the drive shaft 11 of the apparatus body 10 can engage with and disengage from the coupling member 71.

The rotary shaft 85 is a columnar shaft-shaped member which functions as a rotation force transmission portion for transmitting the rotation force received by the coupling member 71. Therefore, the above-described coupling member 71 is disposed in one end of the rotary shaft 85. In addition, in the present embodiment, the rotary shaft 85 is configured to have the enlarged diameter portion 85a in which the diameter of the rotary shaft is partially enlarged. The enlarged diameter portion 85a and the other portion are continuous with each other on a surface tilted in a tapered shape.

The spherical body 90 functions as a proximal end portion, and is a spherical member in the present embodiment, as is understood from FIGS. 8A and 8B. The spherical body 90 is included in an end portion opposite to the side having the coupling member 71 within end portions of the rotary shaft 85. In this case, it is preferable to cause the axis of the rotary shaft 85 and the center of the spherical body 90 to coincide with each other as much as possible. This enables the photosensitive drum 35 to be more stably rotated. In addition, the diameter of the spherical body 90 is configured to have a size to be accommodated inside the ring of the intermediate member 60 of the above-described bearing member 41. It is preferable to configure the diameter so as to be approximately the same as the inner diameter of the ring.

In the present embodiment, a case has been described in which the proximal end portion has a spherical shape, but the present embodiment is not limited thereto. For example, the present embodiment is not particularly limited as long as the proximal end portion has a form which does not interfere with the swing of the shaft member, such as a partially spherical shape and an oval shape in which curved surfaces are combinedly formed.

The rotation force transmission pin 95 is a columnar shaft-shaped member which forms a rotation force transmission projection which projects from the proximal end portion by passing through the center of the spherical body 90, and by both ends protruding from the spherical body 90 after penetrating the spherical body 90. The axis of the rotation force transmission pin 95 is disposed so as to be orthogonal to the axis of the above-described rotary shaft 85.

A material configuring the shaft member 70 is not particularly limited, but it is possible to use a resin such as polyacetal, polycarbonate, and PPS. However, in order to improve rigidity of the member, glass fibers or carbon fibers may be mixed with the resin, depending on load torques. In addition, the rigidity may be further strengthened by inserting metal into the resin, or the shaft member 70 may be entirely or partially manufactured by using the metal.

Figure 10A:
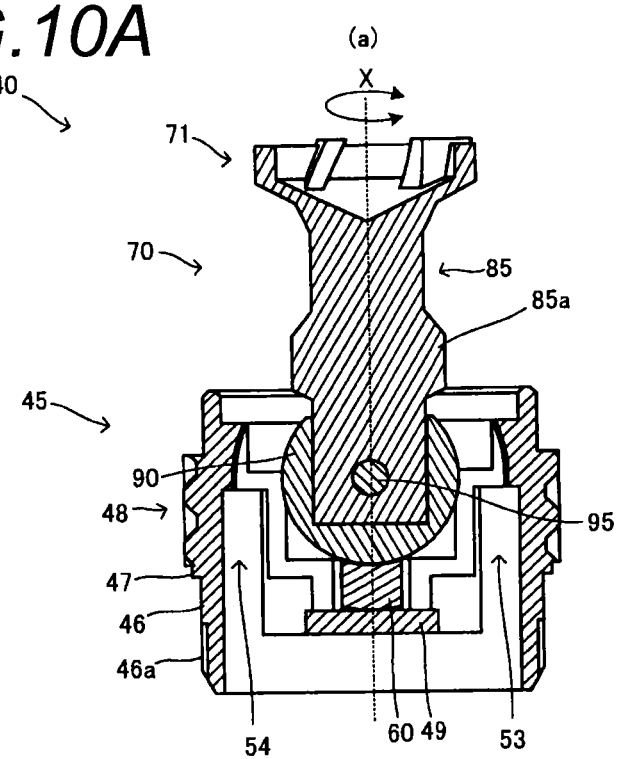
FIG. 10A is a cross-sectional view of the end member 40.
Figure 10B:
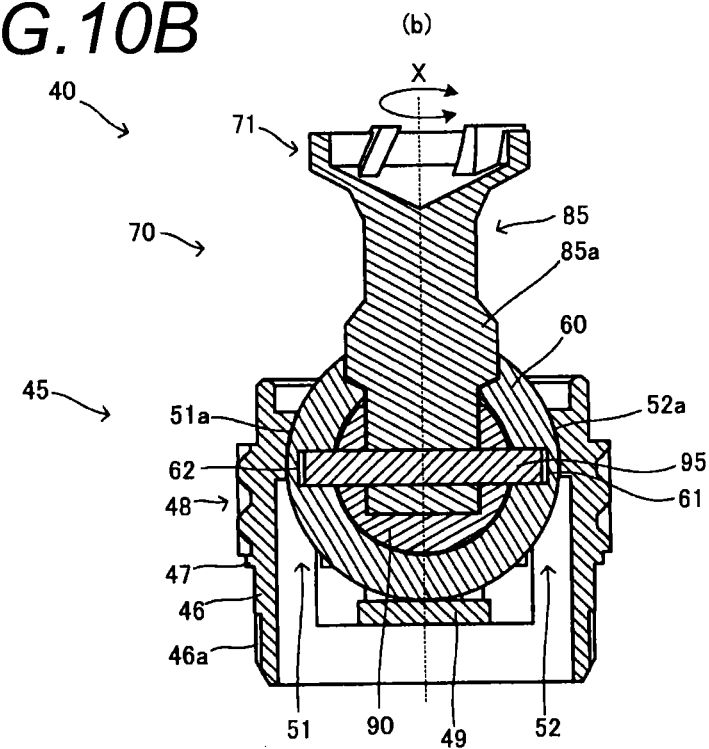
FIG. 10B is another cross-sectional view of the end member 40.
Figure 11A:
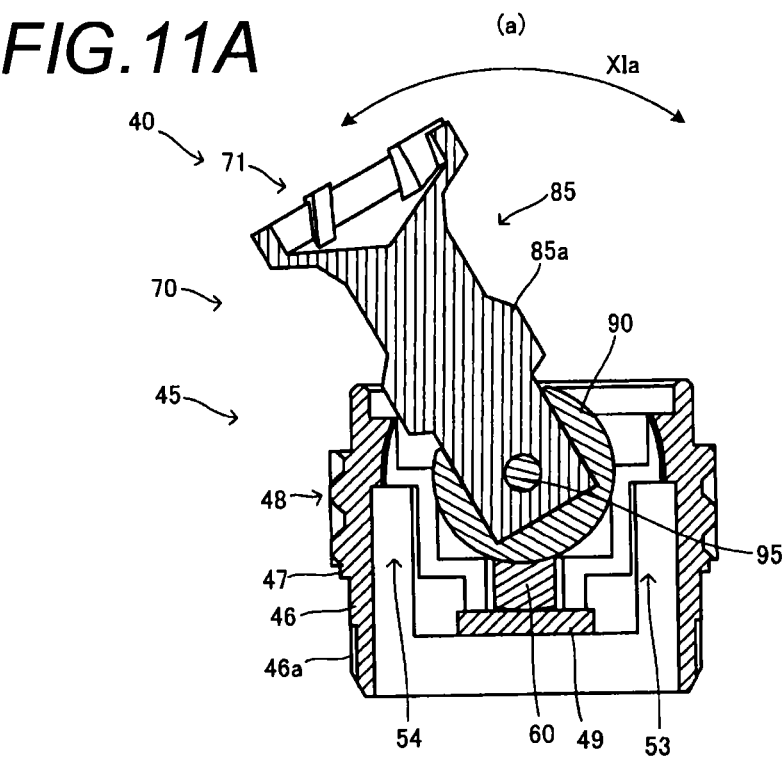
FIG. 11A is a view illustrating an example where the shaft member 70 has a tilted posture on a cross section of the end member 40.
Figure 11B:
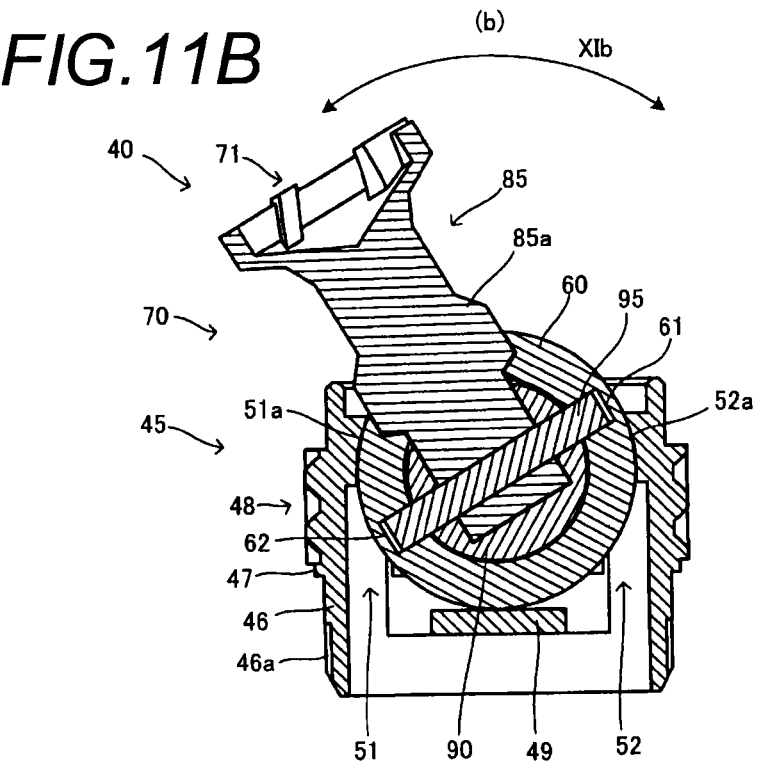
FIG. 11B is a view illustrating an example where the shaft member 70 has a tilted posture on another cross section of the end member 40.

The bearing member 41 and the shaft member 70 are combined as follows so as to configure the end member 40. Description of this combination will further facilitate understanding of a shape, a size, and a positional relationship which are provided for the bearing member 41 and the shaft member 70. FIG. 10A illustrates a cross-sectional view of the end member 40 taken along line VIIIa-VIIIa illustrated in FIG. 3B, and FIG. 10B illustrates a cross-sectional view taken along line VIIIb-VIIIb illustrated in FIG. 3B, respectively. In addition, FIG. 11A illustrates an example of a tilting posture of the shaft member 70 in a viewpoint illustrated in FIG. 10A, and FIG. 11B illustrates an example of a tilting posture of the shaft member 70 in a viewpoint illustrated in FIG. 10B, respectively.

As is particularly well understood from FIG. 10B, the spherical body 90 is arranged inside the ring of the intermediate member 60, and the rotation force transmission pin 95 is inserted into the grooves 61 and 62 of the intermediate member 60. This causes the intermediate member 60 and the shaft member 70 to be combined with each other. Therefore, as illustrated by arrow XIa in FIG. 11A, the shaft member 70 can swing around the axis of the rotation force transmission pin 95 with respect to the intermediate member 60.

In contrast, as is well understood from FIGS. 10A and 10B, in the intermediate member 60 in which the shaft member 70 is arranged, the outer peripheral portion of the intermediate member 60 is fitted into the guide grooves 51 and 52 so that the thickness direction of the intermediate member 60 is the width direction of the guide grooves 51 and 52 formed in the holding portion 50 of the body 45. Therefore, the outer peripheral portion of the intermediate member 60 is arranged inside the guide grooves 51 and 52, and the intermediate member 60 can slideably move inside the guide grooves 51 and 52. As a result, the intermediate member 60 can be rotated inside the body 45 as illustrated by arrow XIb in FIG. 11B.

As in the present embodiment, if the curved surfaces 51a and 52a formed on the bottom surface of the guide grooves 51 and 52 are located on a circle and the outer periphery of the intermediate member 60 is formed to have substantially the same diameter as that of the circle, the intermediate member 60 is accommodated in the body without looseness as illustrated in FIG. 10B. Accordingly, the end member 40 is allowed to more excellently and accurately transmit the rotation.

As described above, in the end member 40 of the present embodiment, the intermediate member 60 is held by the guide grooves 51 and 52 formed in the body 45 so as not to slip out, and the shaft member 70 is held by the intermediate member 60 so as not to slip out. Therefore, the shaft member 70 is not directly held by the body 45.

In addition, this assembly work of the end member 40 can be carried out by first arranging the shaft member 70 in the intermediate member 60 and attaching the intermediate member 60 to the body 45. In this case, when the intermediate member 60 is arranged inside the guide grooves 51 and 52 of the holding portion 50, the assembly work can be carried out through elastic deformation using a weak force. Therefore, it is possible to assemble the shaft member 70 to the bearing member 41 easily and with increased productivity. In addition, not only the assembly work is facilitated, but also the detachment work is similarly facilitated. Accordingly, the reuse is also facilitated. Particularly, in this case, it is not necessary to deform the shaft member 70 during the insertion and the detachment. Accordingly, there is no more possibility of damage. In addition, since the detachment is facilitated, workability can also be improved.

As described above, the shaft member 70 is arranged inside the bearing member 41, thereby enabling the shaft member 70 to swing as illustrated in FIGS. 11A and 11B. That is, in a viewpoint illustrated in FIG. 11A, the shaft member 70 can swing around the axis of the rotation force transmission pin 95 as illustrated by arrow XIa. In contrast, in a viewpoint illustrated in FIG. 11B, the shaft member 70 can swing to follow the rotation of the intermediate member 60 as illustrated by arrow XIb. The swing illustrated in FIG. 10A and the swing illustrated in FIG. 11B are swings in a direction in which the swings are orthogonal to each other.

In addition, when the driving force is received from the apparatus body 10, the shaft member 70 receives the rotation force acting around the axis as illustrated by arrow X in FIGS. 10A and 10B. In this case, both end portions of the rotation force transmission pin 95 of the shaft member 70 press the intermediate member 60, and the intermediate member 60 is caught on by the lateral wall of the guide grooves 51 and 52 of the body 45. In this manner, the rotation force can be transmitted to the photosensitive drum 35. When the distal end of the rotation force transmission pin 95 is configured to reach the inside of the guide grooves 51 and 52, even if the pieces 61a and 62a (refer to FIG. 7C) are not provided, the distal end of the rotation force transmission pin 95 is caught on by the lateral wall of the guide grooves 51 and 52 of the body 45. In this manner, the rotation force can be transmitted to the photosensitive drum 35.

As described above, according to the end member 40, the swing of the shaft member 70 in at least one direction enables the intermediate member 60 and the body 45 to slide and swing, thereby allowing a smooth operation. In this case, the swing has no relationship with a form of the shaft member. Accordingly, even if the shaft member side has slightly uneven dimensions, it is possible to ensure sufficiently smooth swing. In addition, even if an angle of the swing increases, there is no possibility that the shaft member 70 slips out therefrom. Therefore, it is possible to increase the angle of the swing. This can minimize a gap between the photosensitive drum (process cartridge) and the drive shaft on the apparatus body side. Accordingly, it is possible to miniaturize the apparatus body.

In addition, according to the end member 40, it is not necessary to dispose the groove (introduction groove) for introducing the rotation force transmission pin into the swing groove as disclosed in Non Patent Literature 1. It is possible to solve the problem that the shaft member accidentally slips out during the operation.

The above-described configuration enables the shaft member 70 to be pivotally moved (swing), to transmit the rotation force, and to be held by the bearing member 41.

The end member 40 is attached to the photosensitive drum 35 by inserting the end portion on a side where the shaft member 70 does not protrude within the end member 40 into the photosensitive drum 35 after the end member 40 is assembled as illustrated in FIGS. 10A and 10B. This end member 40 properly applies the rotation force to the photosensitive drum 35 when the process cartridge 20 is mounted on the apparatus body 10, and enables the process cartridge 20 to be easily attached and detached.

As described above, the photosensitive drum unit 30, the charging roller unit 22, the developing roller unit 23, the regulating member 24, and the cleaning blade 25 are rotatably accommodated inside the housing 21 of the process cartridge 20 (refer to FIG. 2). That is, each member fulfills its function by being rotated inside the housing when necessary.

Then, in the present embodiment, at least the coupling member 71 within the shaft member 70 of the photosensitive drum unit 30 is arranged to be exposed from the housing 21. As will be described later, this enables the rotation driving force to be obtained from the apparatus body 10, and facilitates the attachment and detachment between the apparatus body 10 and the process cartridge 20.

Here, each member included in the process cartridge 20 has been described as an example, but a member included herein is not limited thereto. It is preferable to provide a member, a portion, and a developer which are normally included in other process cartridges.

Next, the apparatus body 10 will be described. The apparatus body 10 according to the present embodiment is a laser printer. The laser printer is operated in a posture where the above-described process cartridge 20 is mounted thereon. When forming an image, the photosensitive drum 35 is rotated, and the charging roller unit is used in charging. In this state, the laser printer uses various optical members included herein, emits laser beams corresponding to image information to the photosensitive drum 35, and can obtain an electrostatic latent image based on the image information. The latent image is developed by the developing roller unit 23.

In contrast, a recording medium such as a paper sheet is set on the apparatus body 10, and is transported to a transfer position by a feeding roller and a transport roller which are disposed in the apparatus body 10. A transfer roller 10a (refer to FIG. 2) is arranged at the transfer position, and a voltage is applied to the transfer roller 10a whenever the recording medium passes therethrough. In this manner, the image is transferred to the recording medium from the photosensitive drum 35. Thereafter, heat and pressure are applied to the recording medium, thereby fixing the image onto the recording medium. Then, the recording medium on which the image is formed is discharged from the apparatus body 10 by a discharge roller.

As described above, in a posture where the process cartridge 20 is mounted thereon, the apparatus body 10 applies the rotation driving force to the photosensitive drum unit 30. Therefore, how the rotation driving force is applied from the apparatus body 10 to the photosensitive drum unit 30 in the posture where the process cartridge 20 is mounted thereon will be described.

Figure 12A:
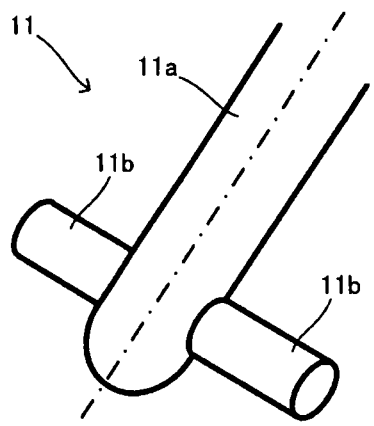
FIG. 12A is a perspective view illustrating a drive shaft 11 of an image forming apparatus body.

The rotation driving force is applied to the process cartridge 20 by the drive shaft 11 serving as a rotation force applying portion of the apparatus body 10. FIG. 12A illustrates a shape of a distal end portion of the drive shaft 11. As is understood from FIG. 12A, the drive shaft 11 has a shaft portion 11a which is a columnar shaft member whose distal end has a spherical surface, and a columnar pin 11b serving as a rotation force applying portion which protrudes in a direction orthogonal to the rotation axis illustrated by a dashed line of the shaft portion 11a. A gear train is formed on a side opposite to the distal end side illustrated in FIG. 12A within the drive shaft 11 so that the drive shaft 11 can be rotated around the axis of the shaft portion 11a of the drive shaft 11. The drive shaft 11 is connected to a motor serving as a drive source via the gear train.

In addition, the drive shaft 11 is arranged to protrude on a trajectory of a movement for attachment and detachment at a substantially right angle, with respect to a movement direction for attaching and detaching the process cartridge 20 illustrated in FIG. 1 to and from the apparatus body 10. Therefore, for the attachment and detachment of the process cartridge 20, it is necessary to attach and detach the shaft member 70 to and from this drive shaft 11. Then, according to the above-described end member 40, the attachment and detachment between the shaft member 70 and the drive shaft 11 are facilitated. A specific aspect of the attachment and detachment will be described in detail later.

Figure 12B:
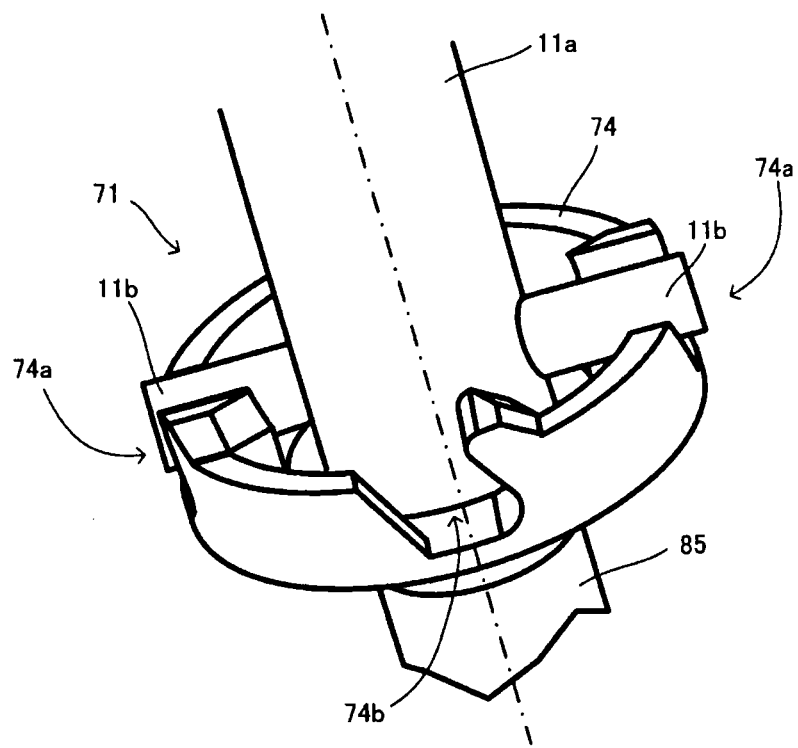
FIG. 12B is a view for describing a posture where the drive shaft 11 is connected to a coupling member 71.

In a posture where the process cartridge 20 is mounted on the apparatus body 10, the drive shaft 11 engages with the coupling member 71 of the shaft member 70 of the end member 40, thereby transmitting the rotation force. FIG. 12B illustrates a scene where the coupling member 71 of the end member 40 engages with the drive shaft 11. As is understood from FIG. 12B, in a posture where the drive shaft 11 and the coupling member 71 engage with each other, the drive shaft 11 and the coupling member 71 are arranged to abut onto each other so that the axis of the shaft portion 11a of the drive shaft 11 coincides with the axis of the coupling member 71. In this case, the pin 11b of the drive shaft 11 is arranged inside the groove 74a or the groove 74b which the coupling member 71 opposes (in FIG. 12B, arranged inside the groove 74a). This causes the coupling member 71 to be rotated to follow the rotation of the drive shaft 11, and causes the photosensitive drum unit 30 to be rotated.

As described above, a posture where the rotation force is transmitted is a posture where the axis of the shaft portion 11a and the axis of the coupling member 71 are arranged coaxially and the pin 11b is located inside the groove 74a or the groove 74b of the coupling member 71.

Figure 13A:
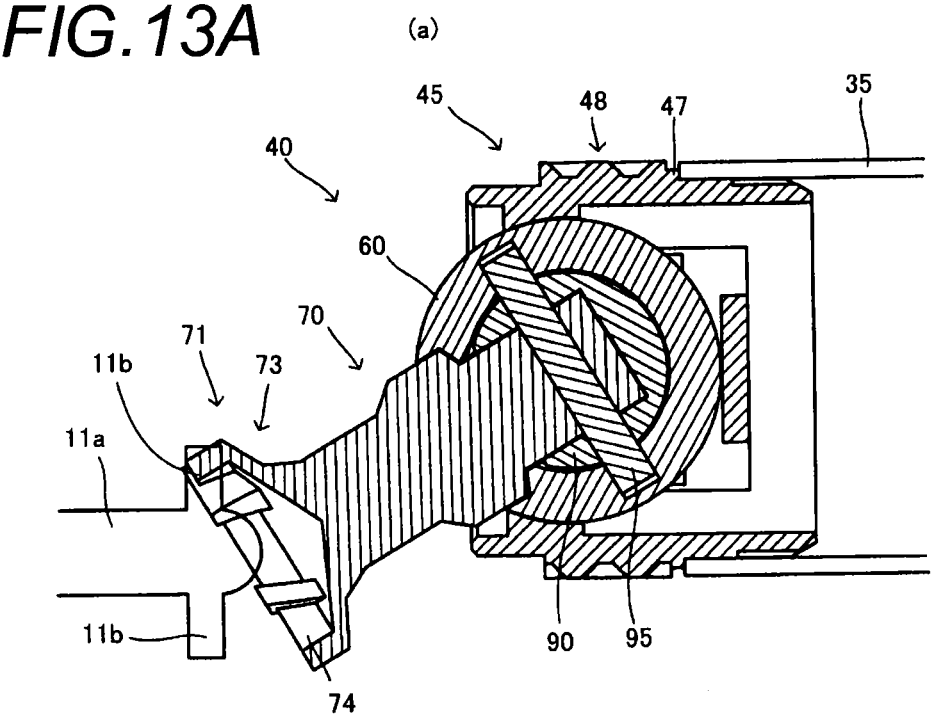
FIG. 13A is a view for describing a scene where a process cartridge is mounted on an apparatus body, and FIG. 13B a view for describing another scene where the process cartridge is mounted on the apparatus body.
Figure 13B:
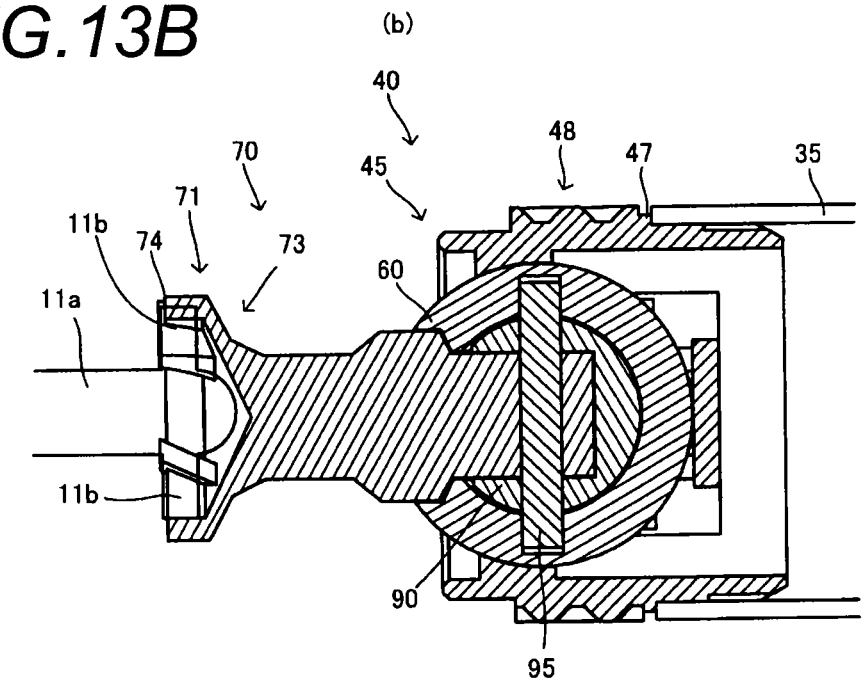

Next, an example of an operation of the drive shaft 11 and the photosensitive drum unit 30 when the process cartridge 20 is mounted on the apparatus body 10 will be described. FIGS. 13A and 13B illustrate a view for describing the example. FIG. 13A is a view illustrating one scene where the end member 40 engages with the drive shaft 11, and FIG. 13B is a view illustrating another scene where the end member 40 engages with the drive shaft 11. The operations are sequentially illustrated by using FIGS. 13A and 13B, and rightward-leftward direction in the drawing paper represents an extending direction of the axis. In addition, these are the scenes where the process cartridge 20 is moved to the lower side in the drawing paper and is mounted on the apparatus body 10.

As illustrated in FIG. 13A, the coupling member 71 of the shaft member 70 is first arranged in a posture of being tilted to the drive shaft 11 side. It is preferable that this posture be a posture where the shaft member 70 is most tilted. If the process cartridge 20 is moved to the lower side in the drawing paper from this posture, the distal end of the drive shaft 11 comes into contact with the inner side of the bottom portion 73 or the engagement wall 74 of the coupling member 71 so as to be caught thereon. If the process cartridge 20 is further pressed into the apparatus body 10, the drive shaft 11 which comes into contact with the coupling member 71 so as to be caught thereon causes the shaft member 70 tilted with respect to the axial direction to be pivotally moved (swing) so that the shaft member 70 moves close to the axial direction. Then, the pin 11b is inserted into the groove 74a.

Then, if the process cartridge 20 is further pressed into the apparatus body 10 in the mounting direction, as illustrated in FIG. 13B, the axis of the tilted shaft member 70 coincides with the axis of the drive shaft 11, and the axes of the drive shaft 11, the shaft member 70, the bearing member 41, and the photosensitive drum 35 coincide with one another, thereby adopting the posture illustrated in FIG. 12B. This causes the rotation force to be properly applied from the drive shaft 11 to the shaft member 70, the bearing member 41, and the photosensitive drum 35. The rotation force is finally applied to the process cartridge 20.

In contrast, an operation of the drive shaft 11 and the photosensitive drum unit 30 when the process cartridge 20 is detached from the apparatus body 10 may be performed by reversing the above-described order.

As described above, the process cartridge 20 can be detached from the apparatus body 10 so as to be pulled out in a direction different from the axial direction of the drive shaft 11 of the apparatus body 10. In addition, the process cartridge 20 can be mounted on the apparatus body 10 so as to be pressed into the apparatus body 10.

Next, a second embodiment will be described. Herein, description will be made by focusing on portions different from those of the process cartridge 20 according to the first embodiment. The same reference numerals are given to elements common to those of the process cartridge 20, and description thereof will be omitted.

Figure 14:
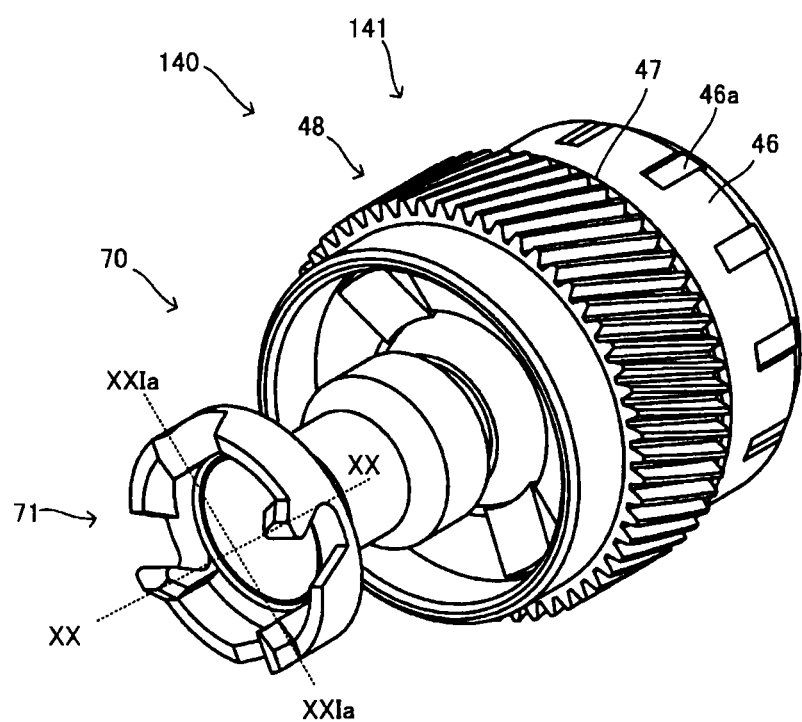
FIG. 14 is a perspective view of an end member 140 which describes a second embodiment.

FIG. 14 is a view for describing the second embodiment, and is a perspective view of an end member 140. FIG. 14 is a view illustrated in the same viewpoint in FIG. 2B. The end member 140 is a member attached to an end portion opposite to the lid member 36 within the end portion of the photosensitive drum 35, and includes a bearing member 141 and the shaft member 70. The shaft member 70 is the same as the above-described one.

Figure 15:
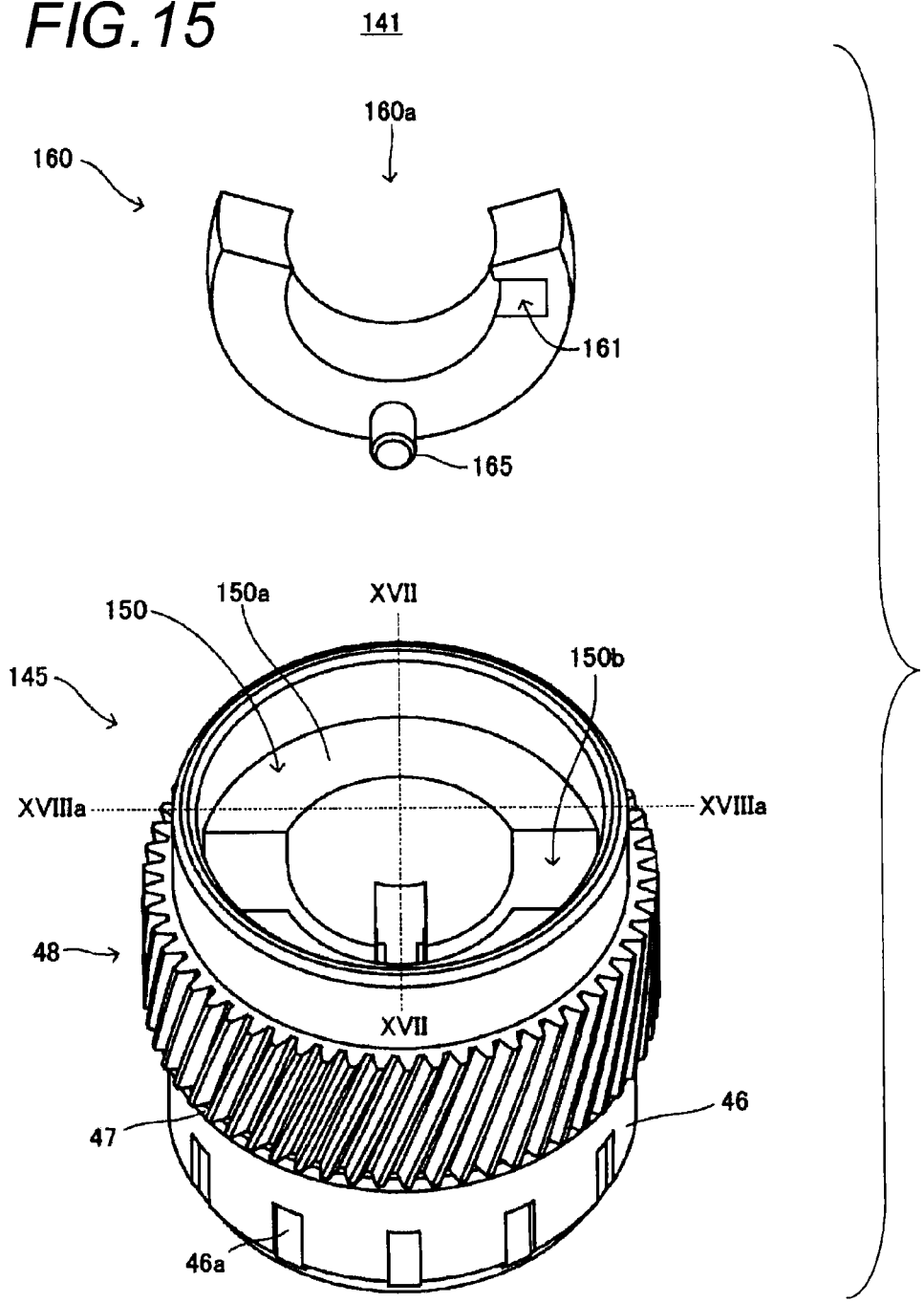
FIG. 15 is an exploded perspective view of a bearing member 141.

The bearing member 141 is a member fixed to the end portion of the photosensitive drum 35. FIG. 15 illustrates an exploded perspective view of the bearing member 141. As is understood from FIG. 15, the bearing member 141 includes a body 145 and an intermediate member 160. Hereinafter, the body 145 and the intermediate member 160 will be respectively described.

Figure 16A:
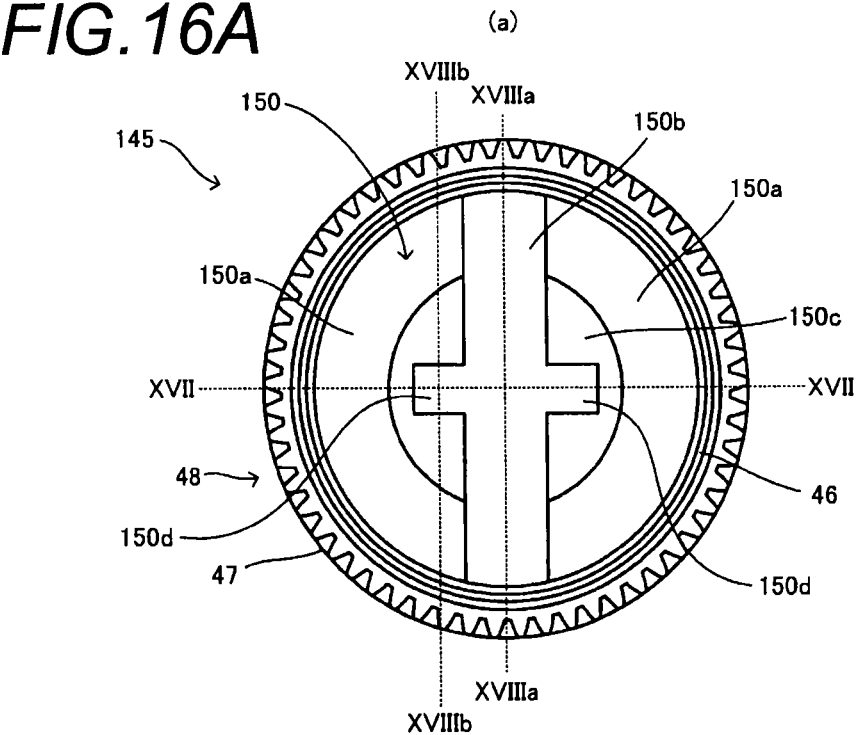
FIG. 16A is a plan view of a body 145 of the bearing member 141.
Figure 16B:
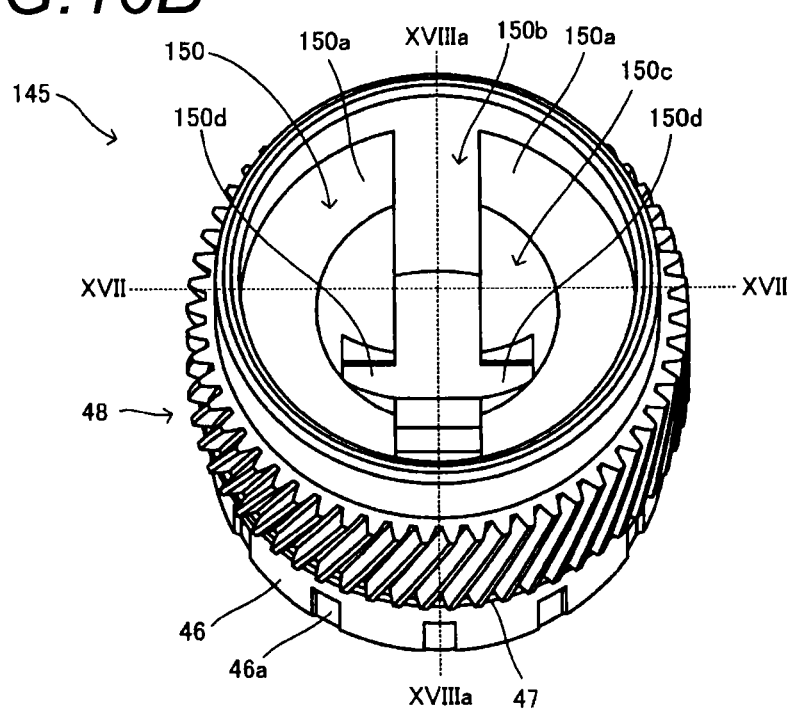
FIG. 16B is a perspective view of the body 145 of the bearing member 141.
Figure 17:
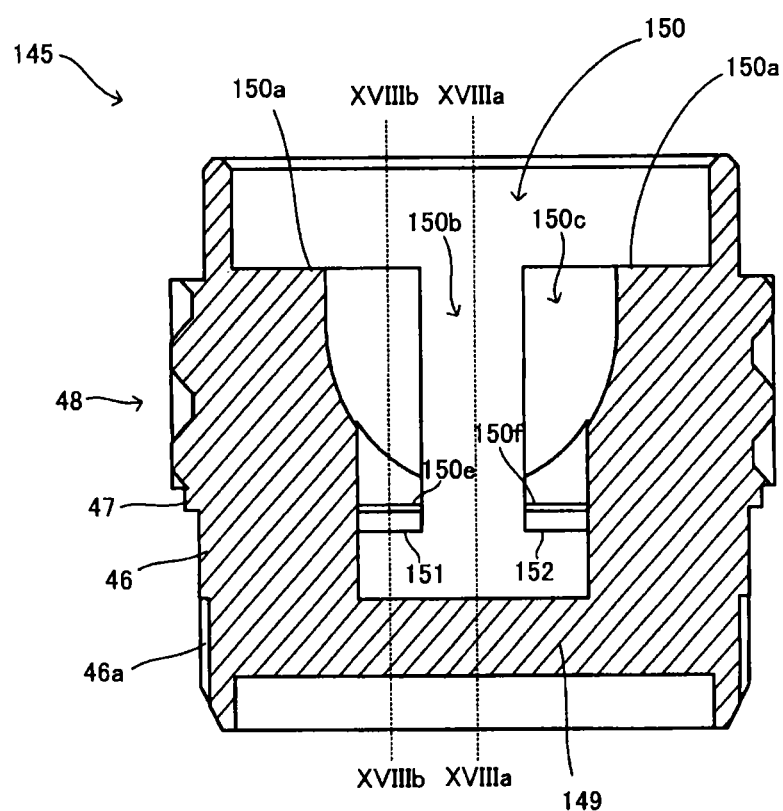
FIG. 17 is a cross-sectional view of the body 145 of the bearing member 141.
Figure 18A:
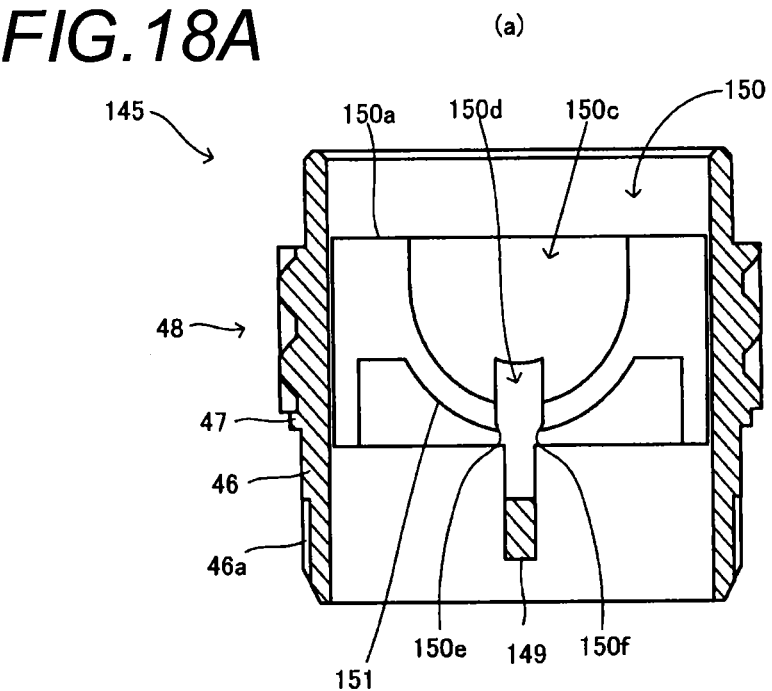
FIG. 18A is another cross-sectional view of the body 145 of the bearing member 141.
Figure 18B:
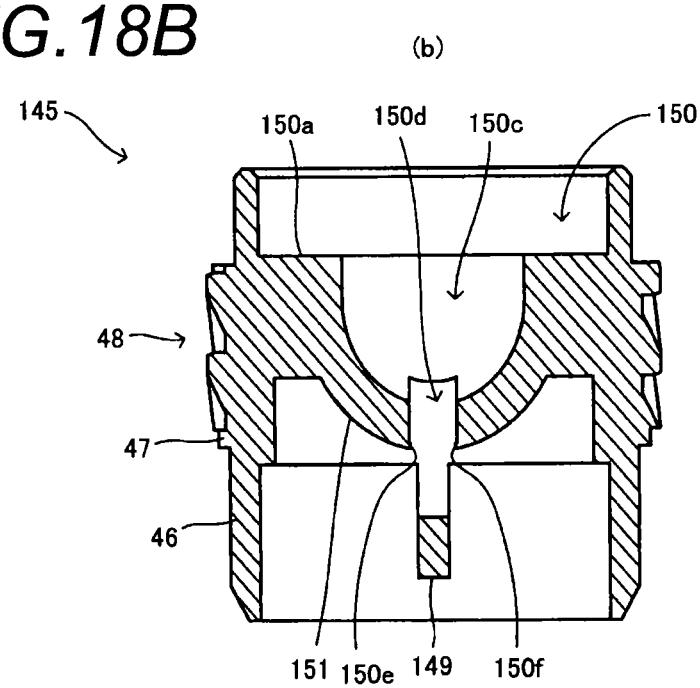
FIG. 18B is further another cross-sectional view of the body 145 of the bearing member 141.

FIG. 16A illustrates a view when the body 145 is viewed from a side into which the intermediate member 160 is inserted, and FIG. 16B illustrates a perspective view when the body 145 is viewed from an angle different from that in FIG. 15, respectively. In addition, FIG. 17 illustrates a cross-sectional view taken along the axis including a line illustrated by XVII-XVII in FIGS. 15, 16A, and 16B. Furthermore, FIG. 18A illustrates a cross-sectional view taken along the axis including a line illustrated by XVIIIa-XVIIIa in FIGS. 15, 16A, 16B, and 17. Then, FIG. 18B illustrates a cross-sectional view taken along the axis including a line illustrated by XVIIIb-XVIIIb in FIGS. 16A and 17.

In the present embodiment, as is understood from FIGS. 14 to 18, the body 145 is different from the body 45 in a form of a bottom portion 149 and a holding portion. Other elements such as the cylindrical body 46, the contact wall 47, and the gear 48 become the same as those of the body 45 in the description, and thus, description thereof will be omitted here.

The bottom portion 149 extending in a rod shape in a radial direction of the cylindrical body 46 is disposed in a cylindrical inner side of the cylindrical body 46 so as to close at least a portion of the inner side of the cylindrical body 46. Furthermore, a holding portion 150 is disposed on an inner side opposite to a side fixed to the photosensitive drum 35 across the bottom portion 149 within the inner side of the cylindrical body 46.

The holding portion 150 forms guide surfaces 151 and 152 serving as an intermediate member guide on the inner side of the cylindrical body 46. Therefore, the holding portion 150 is arranged so that two projections 150a protrude from the inner surface of the cylindrical body 46 toward the axis of the cylindrical body 46 and face each other. A groove 150b is formed between the two projections 150a.

A form of the holding portion 150 will be further described in detail.

As is well understood from FIGS. 16A and 16B, the two projections 150a are arranged to face each other, and a gap is formed therebetween, thereby configuring the groove 150b. In addition, the projection 150a has a concave portion 150c so that a sphere having the center on the axis of the cylindrical body 46 within the projection 150a is partially hollowed. A spherical surface of the concave portion 150c has a shape which enables the spherical body 90 of the shaft member 70 to be accommodated therein. However, the concave portion 150c may not necessarily have the spherical surface.

Furthermore, a guide member insertion groove 150d which extends in the radial direction orthogonal to the radial direction of the cylindrical body 46 in which the groove 150b extends is formed on the bottom of the concave portion 150c. The guide member insertion groove 150d has a form which enables a guide member 165 of the intermediate member 160 (to be described later) to be inserted.

In addition, as is well understood from FIGS. 17 and 18B, a surface is also formed on a side opposite to the concave portion 150c within the projection 150a (that is, a side opposing the bottom portion 149 within the holding portion 150). As is understood from FIG. 18B, the surface has an arc shape. These serve as guide surfaces 151 and 152. The guide surfaces 151 and 152 have a curved surface formed so as to be curved along the extending direction of the groove 150b. The guide member 165 of the intermediate member 160 slides on the guide surfaces 151 and 152, thereby causing the shaft member 70 to swing. The swing will be described later.

Therefore, the guide member insertion groove 150d formed on the bottom portion of the concave portion 150c is a groove which causes the concave portion 150c and a rear surface (surface on which the guide surfaces 151 and 152 are present) of the holding portion 150 to communicate with each other, and which causes the guide member 165 to reach the guide surfaces 151 and 152.

It is preferable that the holding portion 150 having this form be further formed as follows.

The groove width of the groove 150b is not particularly limited, but it is preferable that the width be arranged to be approximately the same as the thickness of the intermediate member 160. This can suppress the looseness of the shaft member 70.

A shape of the inner surface of the concave portion 150c is not particularly limited as long as the shape enables the proximal end portion of the shaft member 70 to be accommodated therein. However, when the proximal end portion of the shaft member 70 is the spherical body 90, it is preferable to provide a curved surface having the same radius as that of the spherical body 90. This also prevents the looseness of the shaft member 70.

It is preferable that the guide member 165 of the intermediate member 160 can be inserted into the guide member insertion groove 150d, and that the guide member insertion groove 150d adopt a snap-fit (interference-fit in the entrance portion) structure with respect to the guide member 165. This can prevent the intermediate member 160 from slipping out from the body 145. For example, the snap-fit structure includes snap-fit structures 150e and 150f which are pieces protruding from a wall surface of the guide member insertion groove 150d.

The guide surfaces 151 and 152 are surfaces for guiding the intermediate member 160 so that the shaft member 70 properly swings, and surfaces for determining the swing of the shaft member 70. Therefore, it is preferable that the guide surfaces 151 and 152 have an arc shape in a cross section illustrated in FIG. 18B from a viewpoint that stable swing can be obtained. That is, it is preferable that the guide surfaces 151 and 152 have an arc shape around the center of the swing of the shaft member. This enables a smooth swing. In addition, in the present embodiment, an arc of the concave portion 150c is also configured to be an arc which is concentric with the guide surfaces 151 and 152.

A material configuring the body 145 is the same as that of the above-described body 45.

Figure 19A:
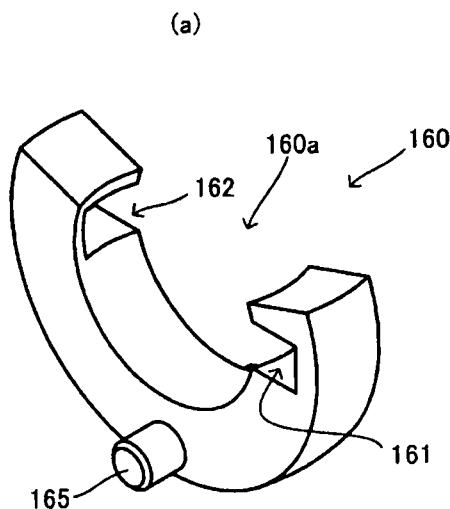
FIG. 19A is a perspective view of an intermediate member 160.
Figure 19B:
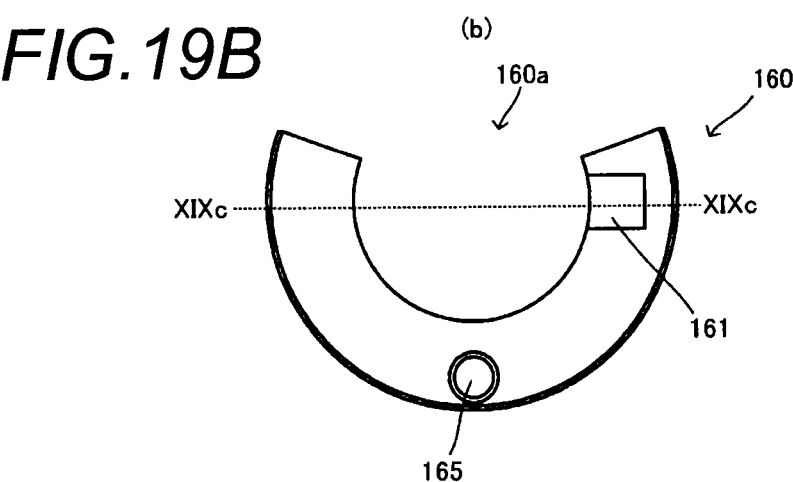
FIG. 19B is a front view of the intermediate member 160.
Figure 19C:
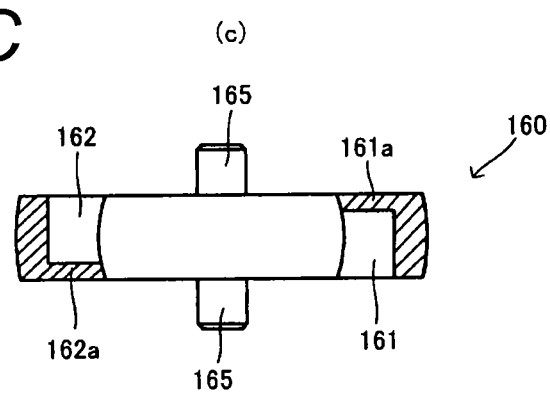
FIG. 19C is a cross-sectional view of the intermediate member 160.

Referring back to FIG. 15, the intermediate member 160 will be described. As is understood from FIG. 15, the intermediate member 160 is an annular member which is partially cut out. FIGS. 19A to 19C illustrate the intermediate member 160. FIG. 19A is a perspective view, FIG. 19B is a front view, and FIG. 19C is a cross-sectional view taken along a line illustrated by XIXc-XIXc in FIG. 19B.

The intermediate member 160 has an annular shape in which a cutout portion 160a is partially disposed.

In the intermediate member 160, an outer peripheral portion thereof is arranged in the groove 150b included in the holding portion 150 of the body 145. Therefore, the outer diameter of the intermediate member 160 has a size which enables the intermediate member 160 to be inserted into the groove 150b.

In contrast, the proximal end portion of the shaft member 70 is arranged on an annular inner side of the intermediate member 160. Accordingly, the annular inner side may have a size and a form which can accommodate the proximal end portion inside the intermediate member 160. In the present embodiment, the proximal end portion of the shaft member 70 is the spherical body 90. Accordingly, the inner diameter of the intermediate member 160 can be configured to be the same as the diameter of the spherical body 90. In addition, as is understood from FIG. 19C, the inner peripheral surface of the intermediate member 160 is also curved in an arc shape in a direction along the axis of the ring (vertical direction on the drawing paper in FIG. 19C). The curve can match the curve formed by the diameter of the spherical body 90. This enables the intermediate member 160 and the spherical body 90 to be more suitably combined with each other.

Then, the size (that is, thickness) in the direction along the axis of the ring of the intermediate member 160 is substantially the same as the width of the guide groove 150b formed in the holding portion 150 of the above-described body 145. This can prevent the looseness.

The cutout portion 160a of the intermediate member 160 has a size and a shape which enable at least the rotary shaft 85 (refer to FIGS. 8A and 8B) of the shaft member 70 to be arranged thereinside.

Two grooves 161 and 162 extending outward from the inner peripheral surface of the ring are disposed in the intermediate member 160. The two grooves 161 and 162 are disposed to oppose each other along the diameter of the intermediate member 160. Both ends of the rotation force transmission pin 95 (refer to FIGS. 8A and 8B) of the shaft member 70 are respectively inserted into the grooves 161 and 162. Therefore, a shape and arrangement of the grooves 161 and 162 are configured so that the end portions of the rotation force transmission pin 95 can be respectively inserted into the grooves 161 and 162.

In addition, it is preferable that pieces 161a and 162a remain in one of the grooves 161 and 162 in the direction along the axis of the ring of the intermediate member 160, and that the grooves 161 and 162 do not penetrate in the direction along the axis. In this manner, when the shaft member 70 is assembled to the intermediate member 160 and the rotation force is applied to the shaft member 70 from the apparatus body 10, the rotation force transmission pin 95 is caught on by the pieces 161a and 162a so that the rotation fore can be properly transmitted to the intermediate member 160. Therefore, in view of the rotation of the rotation force transmission pin 95, as is well understood from FIGS. 19A to 19C, the piece 161a of the groove 161 and the piece 162a of the groove 162 are disposed on different sides in the axial direction of the intermediate member 160.

If a distal end of the rotation force transmission pin 95 extends to reach the inside of the guide groove 150b of the holding portion 150 of the body 145, the distal end of the rotation force transmission pin 95 is caught on by a lateral wall of the guide groove 150b when rotated. Accordingly, since the rotation force can be transmitted, the pieces 161a and 162a may not be necessarily disposed.

In addition, an opening portion opposing the pieces 161a and 162a within the grooves 161 and 162 may be slightly narrowed as compared to the inside of the groove. Specifically, the opening portion can be configured to have an opening which is slightly smaller than the diameter of the rotation force transmission pin 95. In this manner, the rotation force transmission pin 95 which has entered the inside of the grooves 161 and 162 once is less likely to slip out from the grooves 161 and 162 by the narrowed opening portion.

Furthermore, the guide member 165 which functions as a guided portion respectively from annular-shaped front and rear surfaces and extends along the axial direction of the ring is arranged so as to protrude in the intermediate member 160. In the present embodiment, the guide member 165 is a columnar pin. A position where the guide member 165 is arranged is not particularly limited. As will be described later, the guide member 165 may be arranged at a position where the guide member 165 can slide on the guide surfaces 151 and 152 when the intermediate member 160 is arranged in the body 145. In addition, a shape of the guide member 165 is not limited to the column. The guide member 165 may have a cross-sectional shape of a quadrangular column, a triangular column, or others.

A material configuring the intermediate member 160 is not particularly limited, but it is possible to use a resin such as polyacetal, polycarbonate, and PPS. Here, in order to improve rigidity of the member, glass fibers or carbon fibers may be mixed with the resin, depending on load torques. In addition, in order to obtain a smooth swing operation when the intermediate member 160 is attached to the body 145, sliding performance may be improved by causing the resin to contain at least one type among fluorine, polyethylene, and silicone rubber. In addition, the resin may be coated with fluorine, or lubricant may be applied to the resin.

The bearing member 141 and the shaft member 70 are combined with each other as follows so as to configure the end member 140. Description of this combination will further facilitate understanding of a form included in the bearing member 141 and the shaft member 70, or a form and a size of the members.

Figure 20:
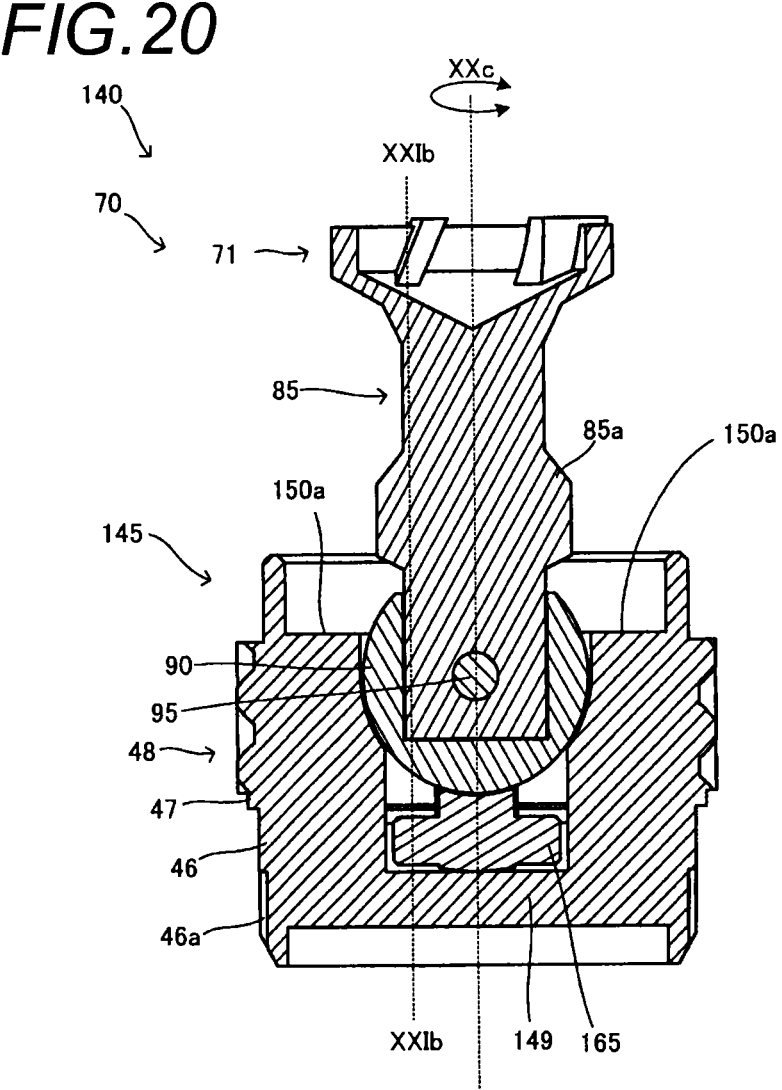
FIG. 20 is a cross-sectional view of an end member 140.
Figure 21A:
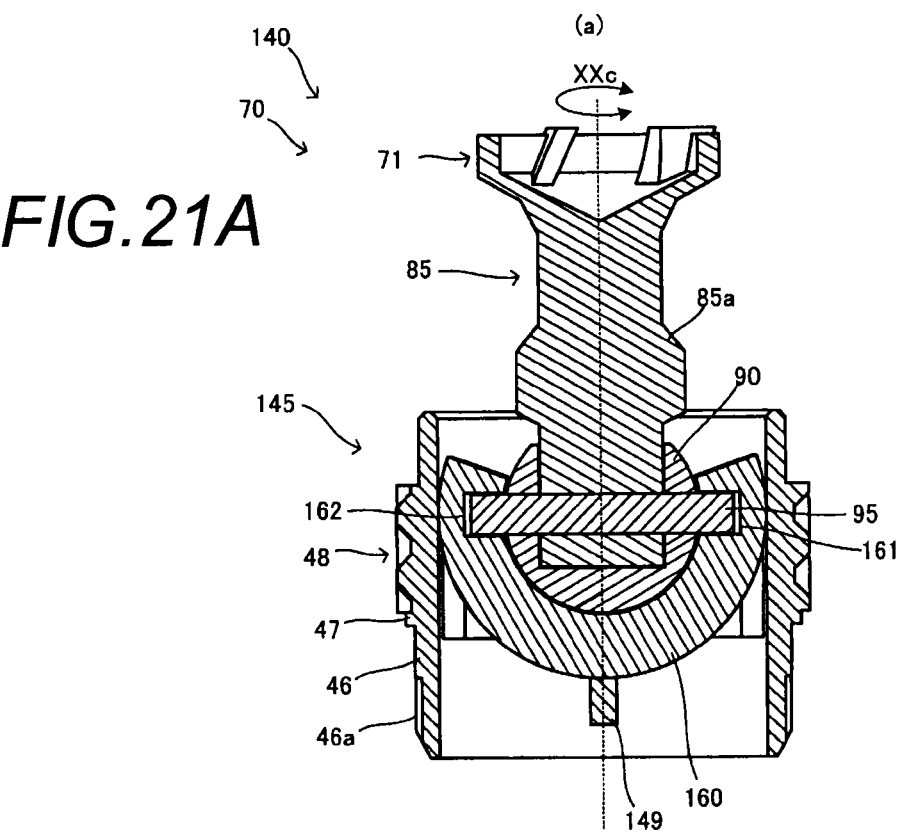
FIG. 21A is another cross-sectional view of the end member 140.
Figure 21B:
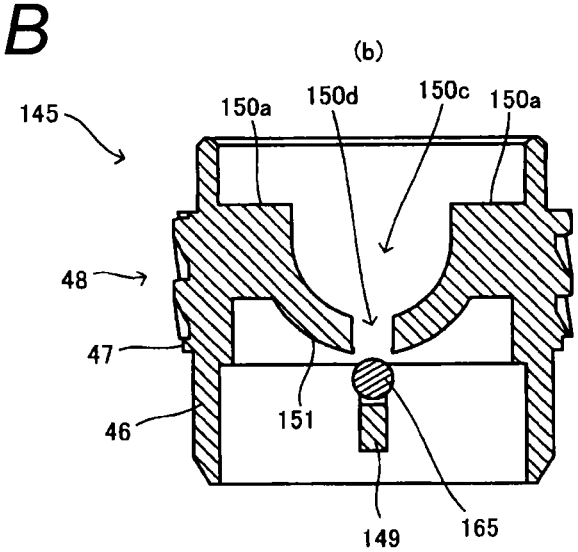
FIG. 21B is further another cross-sectional view of the end member 140.

FIG. 20 illustrates a cross-sectional view of the end member 140 which is taken along line XX-XX illustrated in FIG. 14, and FIG. 21A illustrates a cross-sectional view of the end member 140 which is taken along line XXIa-XXIa illustrated in FIG. 14, respectively. FIG. 21B illustrates a view focusing on a positional relationship between the body 145 and the guide member 165 included in the intermediate member 160, within a cross section of the end member 140 which is taken along line XXIb-XXIb illustrated in FIG. 20. Therefore, the shaft member 70 is omitted in FIG. 21B.

Figure 22:
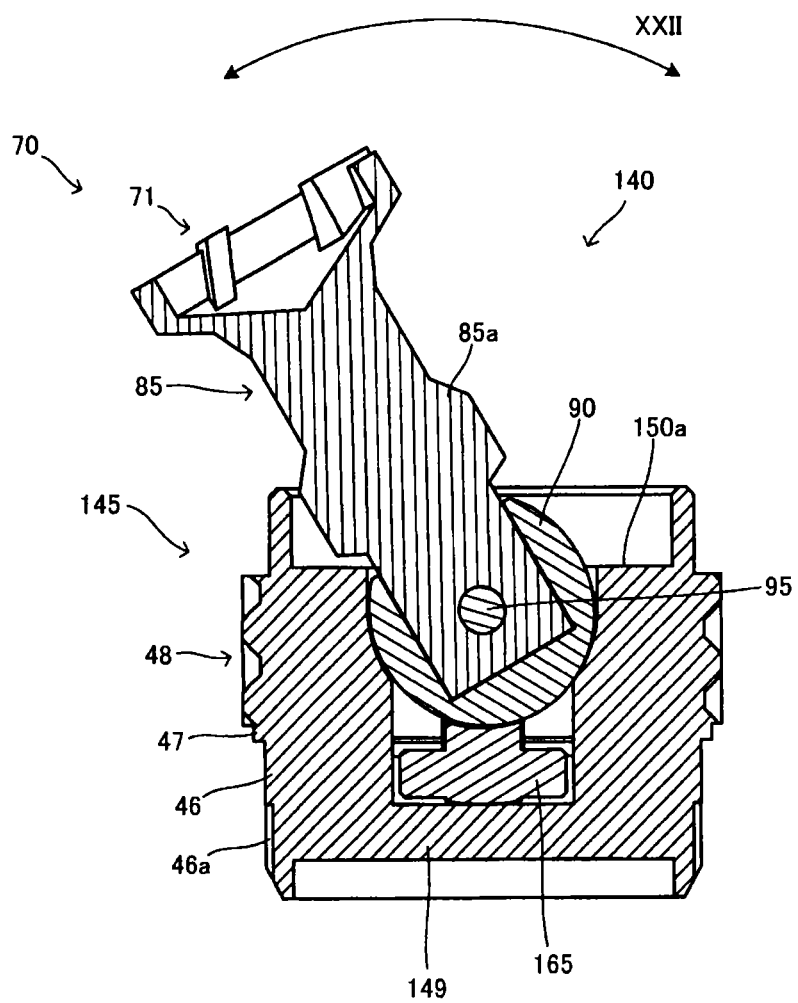
FIG. 22 is a view illustrating an example where the shaft member 70 has a tilted posture on a cross section of the end member 140.
Figure 23A:
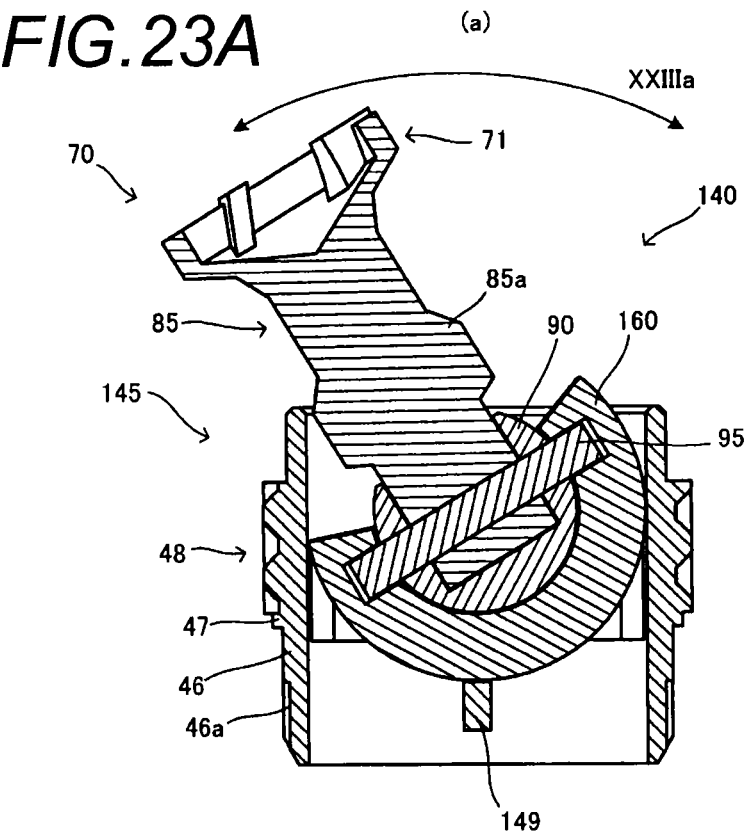
FIG. 23A is a view illustrating an example where the shaft member 70 has a tilted posture on another cross section of the end member 140.
Figure 23B:
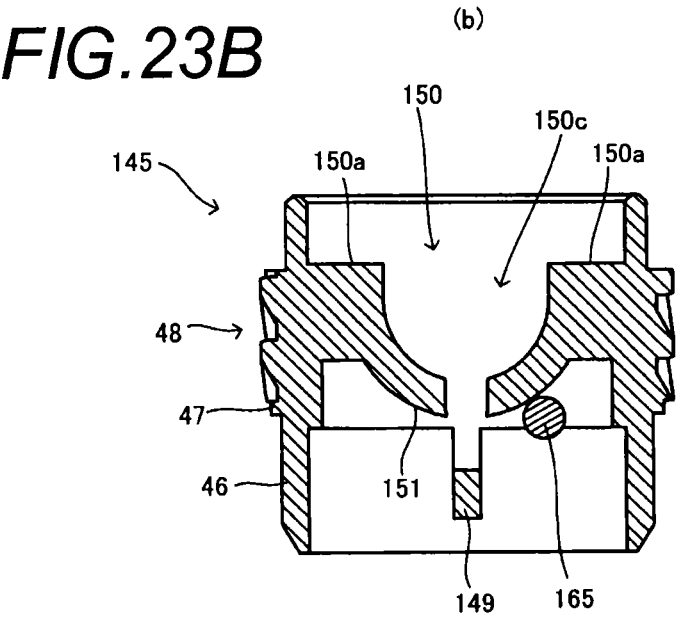
FIG. 23B is a view illustrating an example where the shaft member 70 has a tilted posture on further another cross section of the end member 140.

In addition, FIG. 22 illustrates an example of a posture where the shaft member 70 is tilted in a viewpoint illustrated in FIG. 20, FIG. 23A illustrates an example of a posture where the shaft member 70 is tilted in a viewpoint illustrated in FIG. 21A, and FIG. 23B illustrates an example of a posture where the shaft member 70 is tilted in the posture illustrated in FIG. 21B, respectively.

As is understood particularly well from FIG. 21A, the spherical body 90 is arranged inside the ring of the intermediate member 160, and the rotation force transmission pin 95 is inserted into the grooves 161 and 162 of the intermediate member 160. In this manner, the intermediate member 160 and the shaft member 70 are combined with each other. Therefore, as illustrated by arrow XXII in FIG. 22, the shaft member 70 can swing around the axis of the rotation force transmission pin 95 with respect to the intermediate member 160.

In contrast, as is well understood from FIGS. 20 and 21B, the guide member 165 of the intermediate member 160 is arranged at a position where the guide member 165 penetrates the guide member insertion groove 150d, reaches the bottom portion 149 side, and can slide on the guide surfaces 151 and 152. Then, as will be described later, the guide member 165 slides on the guide surfaces 151 and 152 so that the intermediate member 160 is guided. As a result, as illustrated by arrow XXIIIa in FIG. 23A, the intermediate member 160 can be rotated inside the body 145.

In addition, as is well understood from FIGS. 20, 21A, and 21B, the intermediate member 160 is arranged inside the groove 150b so that the thickness direction of the intermediate member 160 is the groove width direction of the groove 150b formed in the holding portion 150. Therefore, a portion of the intermediate member 160 is arranged inside the groove 150b, and the intermediate member 160 can be moved so as to slide inside the groove 150b.

As described above, in the end member 140 of the present embodiment, the intermediate member 160 is held by the guide surfaces 151 and 152 formed in the body 145 so as not to slip out, and the shaft member 70 is held by the intermediate member 160 so as not to slip out. More specifically, the guide member 165 engages with the guide surfaces 151 and 152 of the body 145, thereby regulating a movement of the shaft member 70 in the direction in which the shaft member 70 is pulled out from the body 145.

In this manner, the shaft member 70 is not directly held by the body 145. However, the proximal end portion 90 of the shaft member 70 is configured so that a movement thereof in directions other than the direction in which the shaft member 70 is pulled out from the body 145 is regulated by the concave portion 150c (for example, refer to FIGS. 16A and 16B) formed in the holding portion 150 of the body 145.

It is possible to adjust a clearance (so-called "slack") between the shaft member 70 and the body 145 by using a relative positional relationship between the guide surfaces 151 and 152 and the guide member 165 and a dimensional relationship between the proximal end portion 90 and the concave portion 150c.

This assembly work of the end member 140 can be carried out by first arranging the shaft member 70 in the intermediate member 160 and attaching the intermediate member 160 to the body 145. In this case, when the guide member 165 of the intermediate member 160 is caused to penetrate the guide member insertion groove 150d, the assembly work can be carried out through elastic deformation using a weak force. Therefore, it is possible to assemble the shaft member 70 to the bearing member 141 easily and with increased productivity. In addition, not only the assembly work is facilitated, but also the detachment work is similarly facilitated. Accordingly, the reuse is also facilitated. Particularly, in this case, it is not necessary to deform the shaft member 70 during the insertion and the detachment. Accordingly, there is no more possibility of damage. In addition, since the detachment is facilitated, workability can also be improved.

As described above, the shaft member 70 is arranged inside the bearing member 141, thereby enabling the shaft member 70 to swing as illustrated in FIGS. 22, 23A, and 23B. That is, in a viewpoint illustrated in FIG. 22, the shaft member 70 can swing around the axis of the rotation force transmission pin 95 as illustrated by arrow XXII. In contrast, in a viewpoint illustrated in FIG. 23A, the shaft member 70 can swing to follow the rotation of the intermediate member 160 as illustrated by arrow XXIIIa. In this case, as illustrated in FIG. 23B, the guide member 165 slides on the guide surfaces 151 and 152. In this manner, the rotation of the intermediate member 160 is guided, and based on this guidance, the shaft member 70 can swing.

The swing illustrated in FIG. 22 and the swing illustrated in FIG. 23A are swings in a direction in which the swings are orthogonal to each other.

In addition, when the driving force is received from the apparatus body 10, the shaft member 70 receives the rotation force acting around the axis as illustrated by arrow XXc in FIGS. 20 and 21A. In this case, both end portions of the rotation force transmission pin 95 of the shaft member 70 press the pieces 161a and 162a (refer to FIG. 19B) of the intermediate member 160, and the intermediate member 160 is caught on by the lateral wall of the groove 150b of the body 145. In this manner, the rotation force can be transmitted to the photosensitive drum 35.

If the distal end of the rotation force transmission pin 95 extends to reach the inside of the guide groove 150b of the holding portion 150 of the body 145, even when the pieces 161a and 162a are not arranged, the distal end of the rotation force transmission pin 95 is caught on by the lateral wall of the guide groove 150b when rotated. In this case, the rotation force can be transmitted without pressing the intermediate member 160.

According to this end member 140, it is possible to obtain an advantageous effect which is the same as that according to the above-described end member 40.

The above-described configuration enables the shaft member 70 to be pivotally moved (swing), to transmit the rotation force, and to be held by the bearing member 141. The end member 140 is attached to the photosensitive drum 35 by inserting the end portion on a side where the shaft member 70 does not protrude within the end member 140 into the photosensitive drum 35 after the end member 140 is assembled as illustrated in FIG. 14. This end member 140 properly applies the rotation force to the photosensitive drum 35 when the process cartridge 20 is mounted on the apparatus body 10, and enables the process cartridge 20 to be easily attached and detached.

Figure 24A:
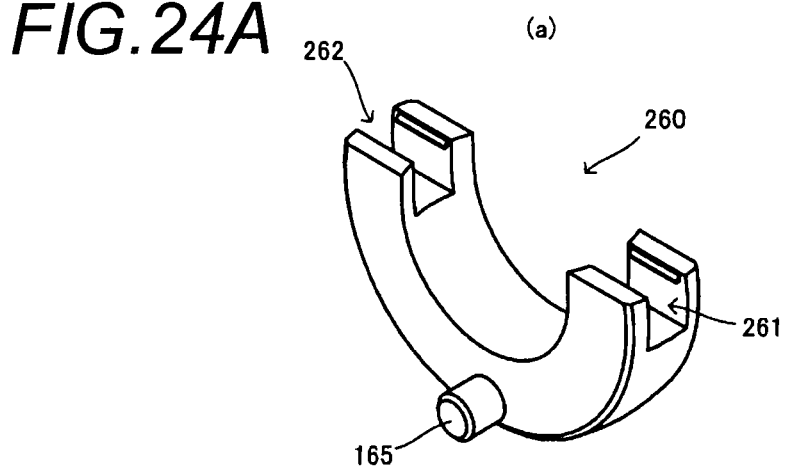
FIG. 24A is a perspective view of an intermediate member 260.
Figure 24B:
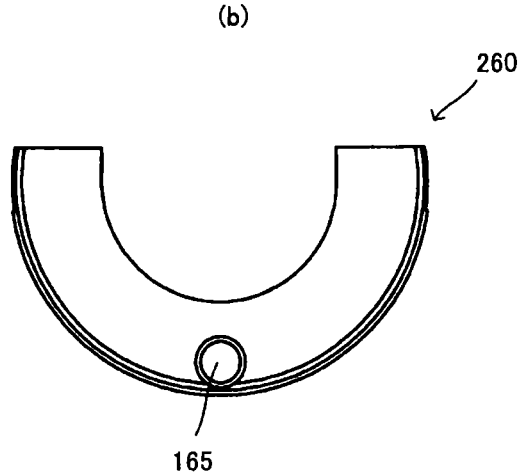
FIG. 24B is a front view of the intermediate member 260.
Figure 24C:
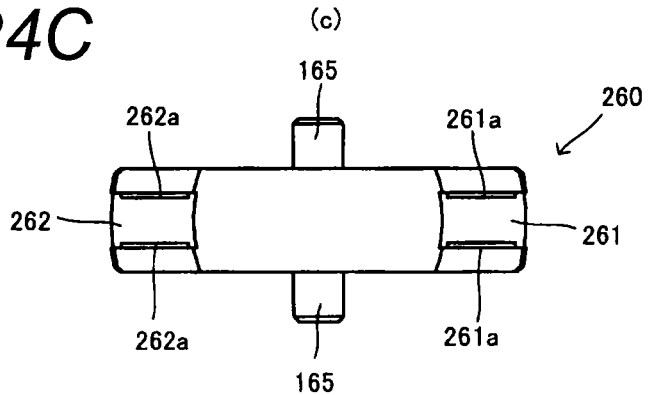
FIG. 24C is a plan view of the intermediate member 260.

Next, a third embodiment will be described. FIGS. 24A and 24B are views for describing the third embodiment, and is a view illustrating an intermediate member 260. FIG. 24A is a perspective view, FIG. 24B is a front view, and FIG. 24C is a plan view.

In the present embodiment, a form of a portion with which the rotation force transmission pin 95 of the shaft member 70 within the intermediate member 260 is different from that of the intermediate member 160. Other elements are the same as those of the above-described end member 140, and thus, the intermediate member 260 will be described here.

Figure 25A:
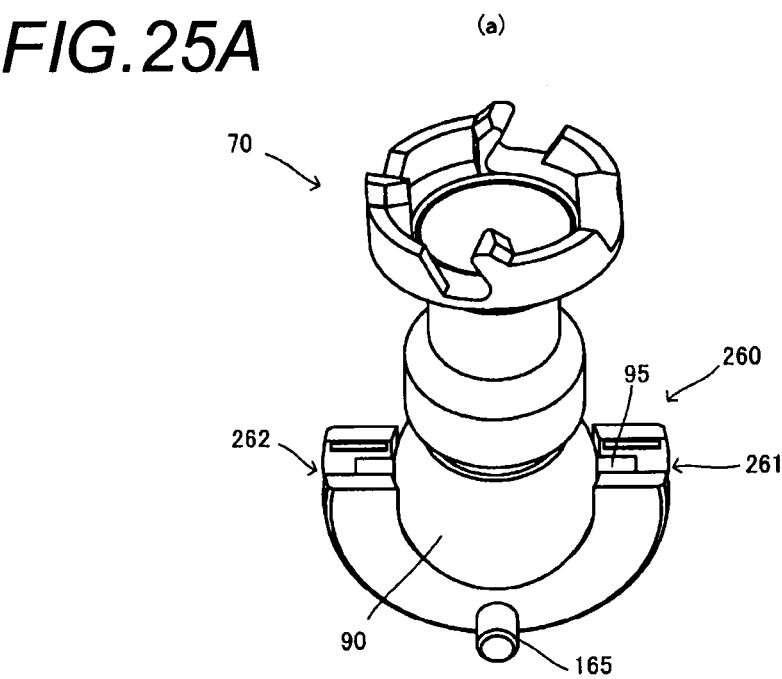
FIG. 25A is a perspective view of a posture where the shaft member 70 is attached to the intermediate member 260.
Figure 25B:
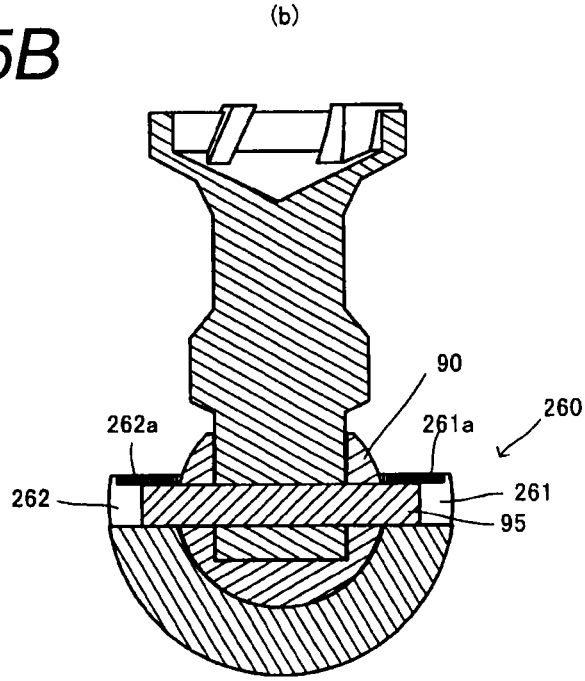
FIG. 25B is a cross-sectional view of the posture where the shaft member 70 is attached to the intermediate member 260.

The intermediate member 260 is formed in a semi-annular shape in a front view as illustrated in FIG. 24B, and grooves 261 and 262 extending in the radial direction are formed on an end surface thereof. The groove width of the grooves 261 and 262 is approximately the same as the diameter of the rotation force transmission pin 95. Then, snap-fit (interference-fit in the entrance portion) structures 261a and 262a are formed on the end surface side of the intermediate member 260 in the grooves 261 and 262. This enables the rotation force transmission pin 95 of the shaft member 70 to engage with the grooves 261 and 262 without being detached therefrom. FIGS. 25A and 25B illustrate views for describing this configuration.

FIG. 25A is a perspective view illustrating a posture where the shaft member 70 is combined and engaged with the intermediate member 260, and FIG. 25B is a cross-sectional view taken along the axis in FIG. 25A. As is understood from FIGS. 25A and 25B, at least a portion of both end portions of the rotation force transmission pin 95 is arranged inside the grooves 261 and 262. In addition, a configuration is adopted so that the snap-fit structures 261a and 262a cause the rotation force transmission pin 95 not to slip out from the grooves 261 and 262.

According to this intermediate member 260, it is possible to more easily attach the shaft member 70 to the intermediate member 260. Therefore, for example, when the photosensitive drum unit 30 is assembled, the bearing member in which the intermediate member 260 has been already mounted on the body is first fixed to the end portion of the photosensitive drum 35. Thereafter, the shaft member 70 can be mounted on the intermediate member 260 of the bearing member. According to this assembly, it is possible to attach the unstably swinging shaft member 70 individually and lastly. Therefore, it is possible to improve convenience in the assembly.

In addition, in the snap-fit structures 261a and 262a for regulating the detachment (disengagement) of the rotation force transmission pin 95 and the snap-fit structures 150e and 150f of the guide member insertion groove 150d for regulating the detachment (disengagement) of the guide member 165, a degree of a force needed to pull out (disengage) the rotation force transmission pin 95 and the guide member 165 is adjusted. In this manner, it is possible to cause the intermediate member to remain in the body side when the shaft member 70 is detached, and to detach the intermediate member 260 together with the shaft member 70 from the body. For example, when the body 145 and the intermediate member 260 are combined for reuse, an interference-fit condition of the snap-fit structures 261a and 262a is adjusted to be relatively weaker than an interference-fit condition of the snap-fit structures 150e and 150f of the guide member insertion groove 150d, and it is no longer necessary to separately manage the intermediate member 260 and the body 145 since the intermediate member 260 remains in the body 145. Therefore, the reuse is further facilitated, and the workability is improved. On the other hand, when only the body 145 or only the intermediate member 260 is reused, if the intermediate member 260 does not remain in the body 145, man-hours are reduced in separating the intermediate member and the body later. Therefore, the interference-fit condition of the snap-fit structures 261a and 262a may be adjusted to be relatively stronger than the interference-fit condition of the snap-fit structures 150e and 150f of the guide member insertion groove 150d, thereby improving the workability.

Next, a fourth embodiment will be described. In the fourth embodiment, a form of a body 345 is different from the form of the above-described body 145. Other elements can be similarly considered, and thus, the body 345 will be described here. The same reference numerals are given to those which are considered to be the same as the members and elements which have been described hitherto, and description thereof will be omitted.

Figure 26A:
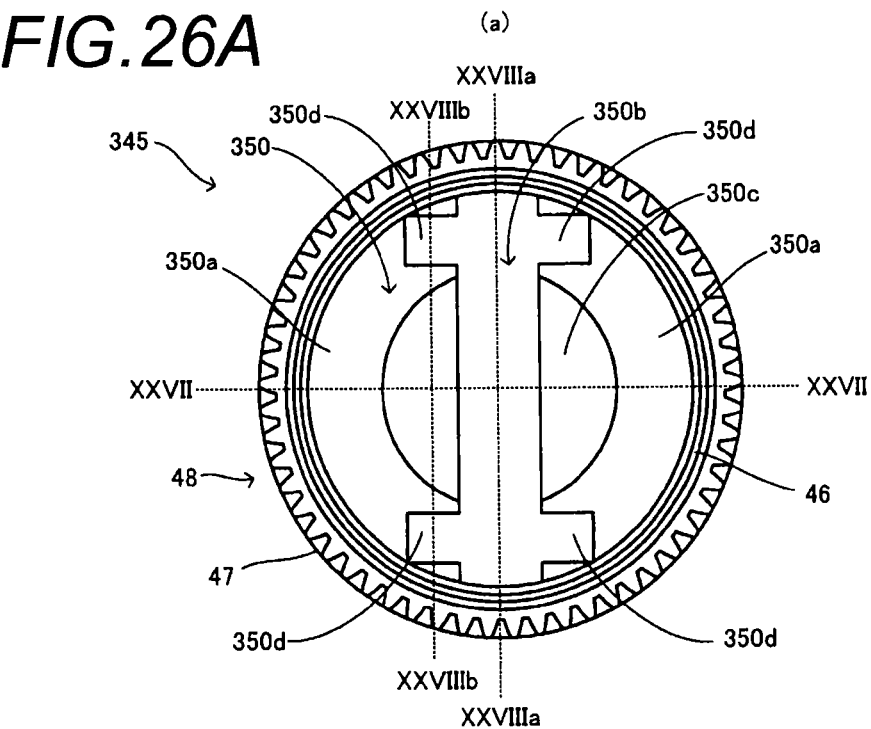
FIG. 26A is a plan view of a body 345 of a bearing member 341.
Figure 26B:
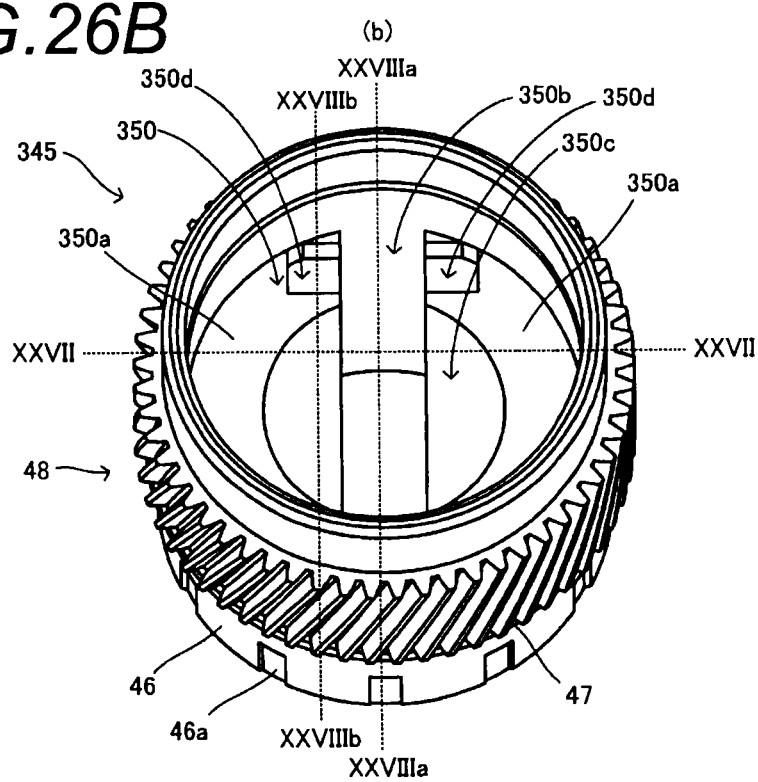
FIG. 26B is a perspective view of the body 345 of the bearing member 341.
Figure 27:
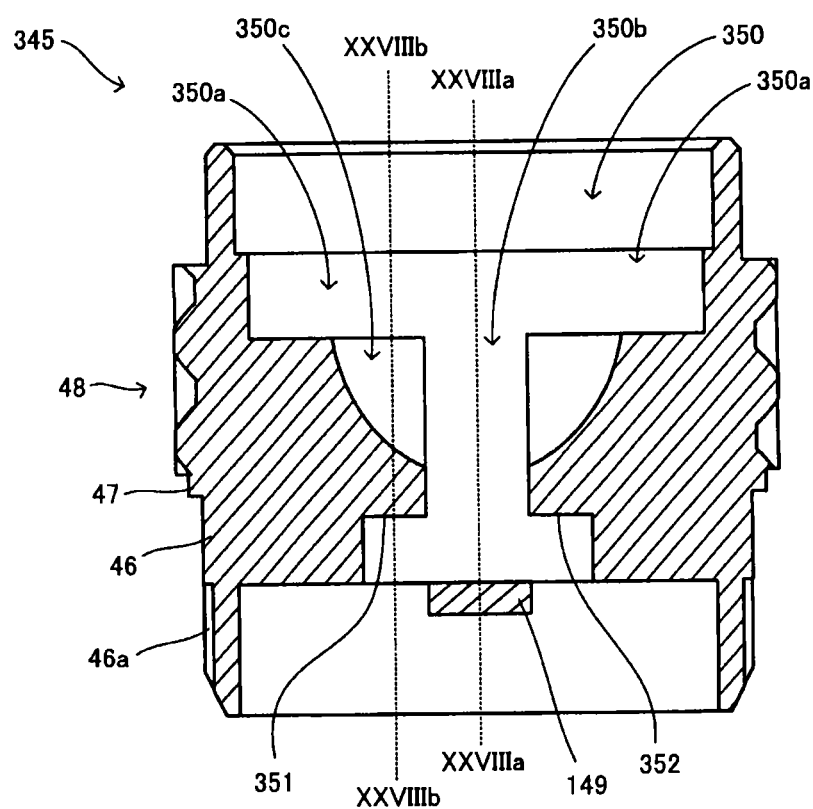
FIG. 27 is a cross-sectional view of the body 345 of the bearing member 341.
Figure 28A:
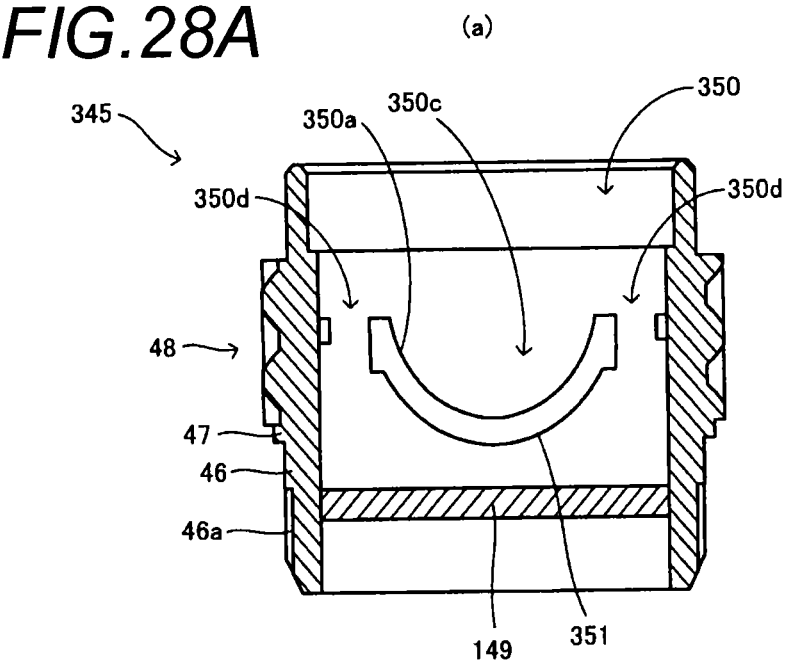
FIG. 28A is another cross-sectional view of the body 345 of the bearing member 341.
Figure 28B:
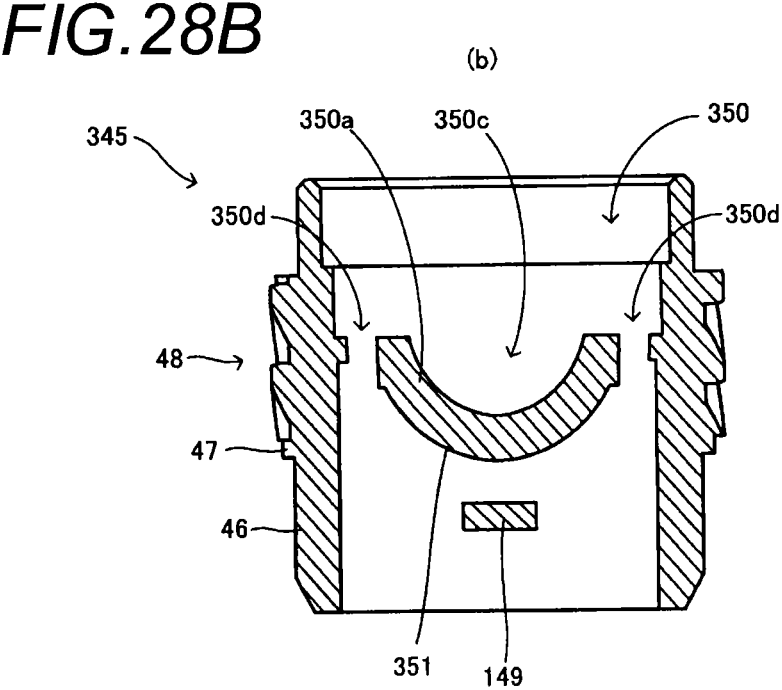
FIG. 28B is further another cross-sectional view of the body 345 of the bearing member 341.

FIG. 26A illustrates a plan view when the body 345 is viewed from a side into which the intermediate member 160 is inserted, and FIG. 26B illustrates a perspective view of the body 345. In addition, FIG. 27 illustrates a cross-sectional view along the axis including a line illustrated by XXVII-XXVII in FIGS. 26A and 26B. Furthermore, FIG. 28A illustrates a cross-sectional view along the axis including a line illustrated by XXVIIIa-XXVIIIa in FIGS. 26A, 26B, and 27. Then, FIG. 28B illustrates a cross-sectional view along the axis including a line illustrated by XXVIIIb-XXVIIIb in FIGS. 26A, 26B, and 27.

The bottom portion 149 extending in a rod shape in the radial direction of the cylindrical body 46 is disposed in a cylindrical inner side of the cylindrical body 46 so as to close at least a portion of the inner side of the cylindrical body 46. Furthermore, a holding portion 350 is disposed on an inner side opposite to a side fixed to the photosensitive drum 35 across the bottom portion 149 within the inner side of the cylindrical body 46.

The holding portion 350 forms guide surfaces 351 and 352 serving as an intermediate member guide on the inner side of the cylindrical body 46. Therefore, the holding portion 350 is arranged so that two projections 350a protrude from the inner surface of the cylindrical body 46 toward the axis of the cylindrical body 46 and face each other. A groove 350b is formed between the two projections 350a.

A form of the holding portion 350 will be further described in detail.

As is well understood from FIGS. 26A and 26B, the two projections 350a are arranged to face each other, and a gap is formed therebetween, thereby configuring the groove 350b. In addition, the projection 350a has a concave portion 350c so that a sphere having the center on the axis of the cylindrical body 46 within the projection 350a is partially hollowed. A portion of the spherical surface of the concave portion 350c has a shape which enables the spherical body 90 of the shaft member 70 to be accommodated therein. However, the concave portion 350c may not necessarily have the spherical surface.

Then, guide surfaces 351 and 352 are formed on a surface opposite to the concave portion 350c within the projection 350a.

Furthermore, in the holding portion 350, a guide member insertion groove 350d is disposed between the cylindrical body 46 and the concave portion 350c within the end surface of the projection 350a. The guide member insertion groove 350d is disposed so as to cause the concave portion 350c side to communicate with the guide surfaces 351 and 352 side, and further one end thereof is open through the groove 350b. A size and a shape of the guide member insertion groove 350d are formed so that the guide member 165 of the intermediate member 160 can be inserted into the guide member insertion groove 350d.

In the present embodiment, the guide member insertion grooves 350d are respectively disposed on one side and the other side of the groove 350b. However, the guide member insertion grooves 350d are not necessarily disposed on both sides. The guide member insertion groove 350d may be disposed on any one side. In the above-described body 145, the guide member insertion groove 150d is disposed on the bottom of the concave portion 150c. However, in the present embodiment, the guide member insertion groove 350d is disposed in the end portion of the groove 350b as described above. This can eliminate a possibility that the guide member insertion groove 350d influences the movement of the intermediate member 160. That is, as will be described later, when the guide member 165 of the intermediate member 160 moves along the guide surfaces 351 and 352 (refer to FIG. 27) of the holding portion 350, the guide member 165 is not caught on by the guide member insertion groove 350d. Accordingly, a smooth movement is allowed. In addition, even when the shaft member 70 is pulled carelessly, it is possible to prevent the shaft member 70 from being detached unintentionally.

From a viewpoint of manufacturing the end member so that a mold is arranged, it is also possible to dispose a groove penetrating in the axial direction in any one of the projections 350a (not illustrated). In this case, the swing of the shaft member 70 is smoothly maintained by forming the groove to be thinner than the guide member 165.

As described above, a surface is also formed on a side opposite to the concave portion 350c within the projection 350a (that is, a side opposing the bottom portion 149 within the holding portion 350). As is understood from FIG. 28B, the surface has an arc shape. These serve as guide surfaces 351 and 352. The guide surfaces 351 and 352 have a curved surface formed so as to be curved along the extending direction of the groove 350b. The guide member 165 of the intermediate member 160 slides on the guide surfaces 351 and 352, thereby causing the shaft member 70 to swing similarly as described above.

Therefore, the guide member insertion groove 350d causes the concave portion 350c side of the projection 350a and a rear surface (surface on which the guide surfaces 351 and 352 are present) of the holding portion 350 to communicate with each other, and causes the guide member 165 to reach the guide surfaces 351 and 352.

It is preferable that the holding portion 350 having this form be further formed as follows.

The groove width of the groove 350b is not particularly limited, but it is preferable that the width be arranged to be approximately the same as the thickness of the intermediate member 160. This can suppress the looseness of the shaft member 70.

A shape of the inner surface of the concave portion 350c is not particularly limited as long as the shape enables the proximal end portion of the shaft member 70 to be accommodated therein. However, when the proximal end portion of the shaft member 70 is the spherical body 90, it is preferable to provide a curved surface having the same radius as that of the spherical body 90. This also prevents the looseness of the shaft member 70.

It is preferable that the guide member 165 of the intermediate member 160 can be inserted into the guide member insertion groove 350d, and that the guide member insertion groove 350d adopt a snap-fit (interference-fit in the entrance portion) structure with respect to the guide member 165.

The guide surfaces 351 and 352 are surfaces for determining the swing of the shaft member 70. Therefore, it is preferable that the guide surfaces 351 and 352 have an arc shape in a cross section illustrated in FIG. 28B from a viewpoint that stable swing can be obtained. That is, it is preferable that the guide surfaces 351 and 352 have an arc shape around the center of the swing of the shaft member 70. This enables smooth swing. In addition, in the present embodiment, an arc of the concave portion 350c is also configured to be an arc which belongs to the same circle to which the guide surfaces 351 and 352 belong.

Figure 29:
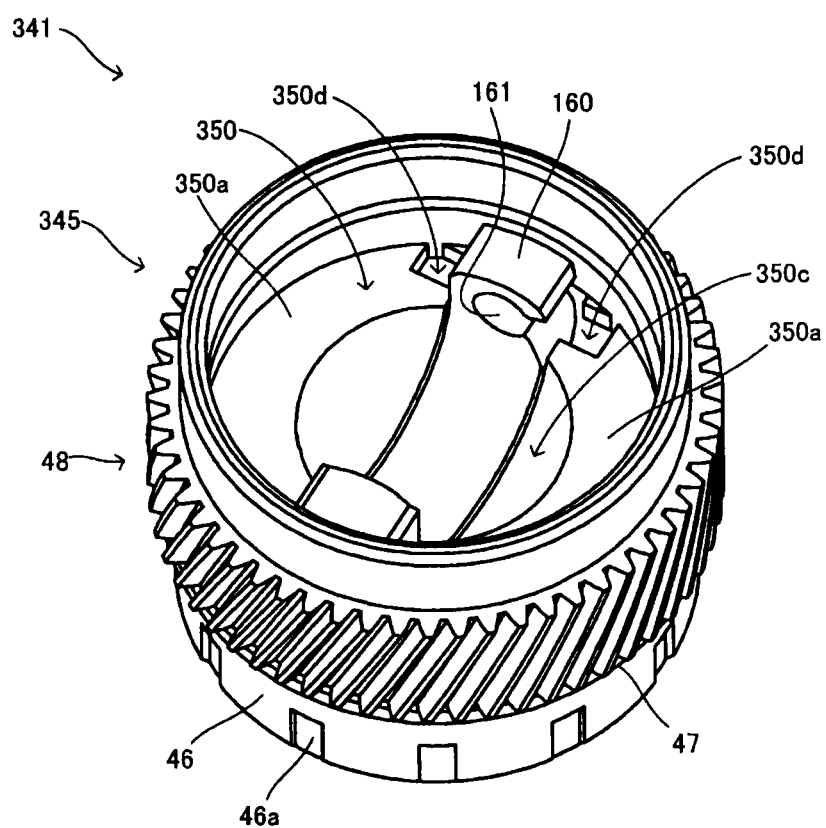
FIG. 29 is a perspective view of the bearing member 341.
Figure 30A:
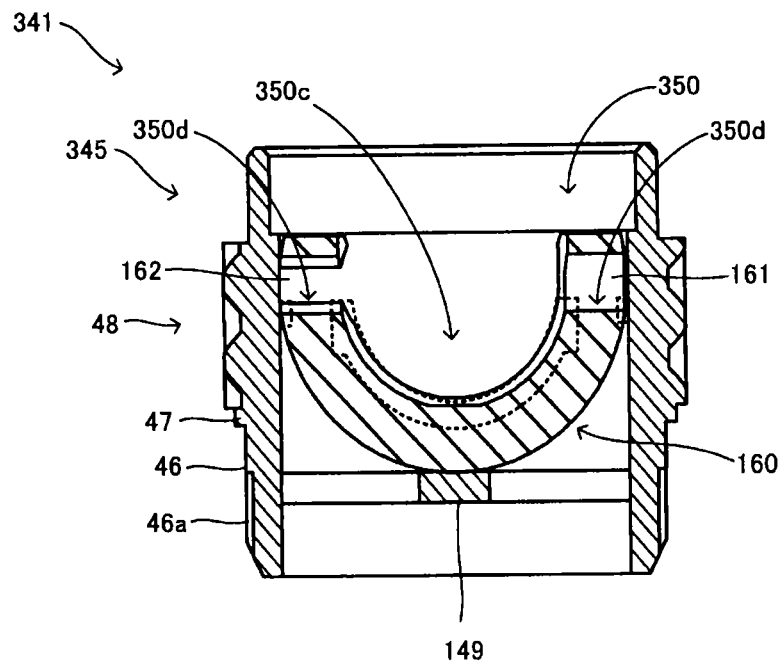
FIG. 30A is a cross-sectional view of the bearing member 341.
Figure 30B:
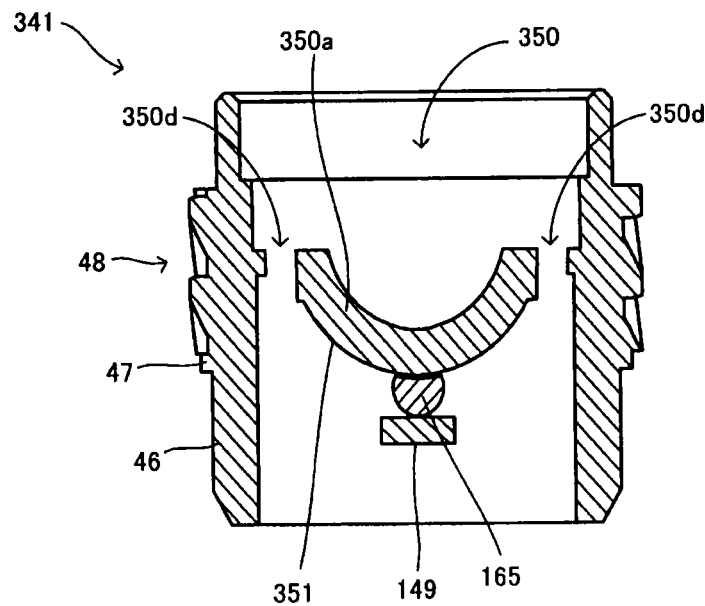
FIG. 30B is another cross-sectional view of the bearing member 341.
Figure 31:
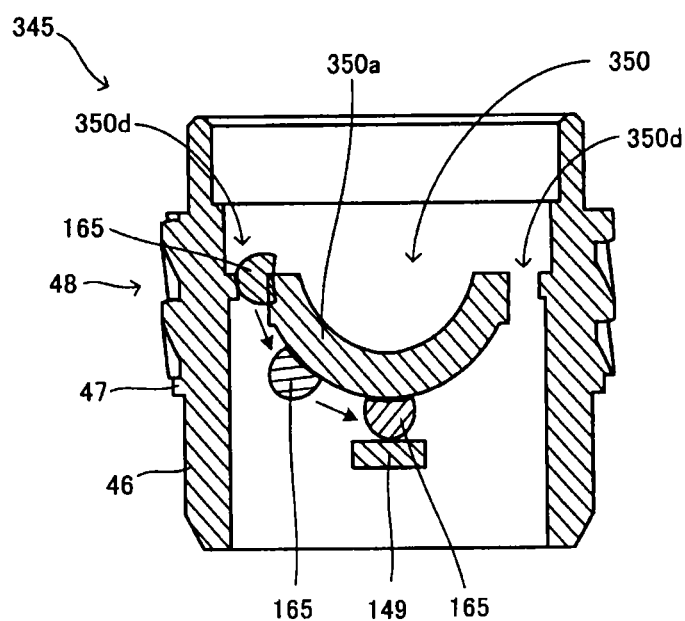
FIG. 31 is a view for describing a scene where the intermediate member 160 is attached to the body 345.

FIGS. 29 and 30 illustrate a view in which the intermediate member 160 is combined with the body 345 so as to configure a bearing member 341. FIG. 29 is a perspective view, FIG. 30A is a view illustrated by using the same viewpoint in FIG. 28A, and FIG. 30B is a view illustrated by using the same viewpoint in FIG. 28B. FIG. 31 is a view illustrating a state of a movement of the guide member 165 when the intermediate member 160 is combined with the body 345.

As is understood from these drawings, in the bearing member 341, the guide member 165 of the intermediate member 160 is arranged at a position where the guide member 165 penetrates the guide member insertion groove 350d, reaches the bottom portion 149 side (sequentially as illustrated by a straight line arrow in FIG. 31), and can slide on the guide surfaces 351 and 352. Then, similar to the above-described bearing member 141, the guide member 165 slides on the guide surfaces 351 and 352. In this manner, the intermediate member 160 is guided. As a result, the intermediate member 160 can be rotated inside the body 345.

In addition, as is well understood from FIG. 29, the intermediate member 160 is arranged inside the groove 350b so that the thickness direction of the intermediate member 160 is the groove width direction of the groove 350b formed in the holding portion 350. Therefore, a portion of the intermediate member 160 can be arranged inside the groove 350b, and the intermediate member 160 can be rotated (swung) so as to slide inside the groove 350b.

Furthermore, in the bearing member 341 of the present embodiment, as is well understood from FIGS. 29 and 30A, when both ends of the intermediate member 160 adopt a posture of being arrayed side by side in the direction orthogonal to the axis of the body 345 (radial direction of the body 345), the grooves 161 and 162 of the intermediate member 160 adopt a structure in which the grooves 161 and 162 of the intermediate member 160 are exposed by projecting from the projection 350a formed in the holding portion 350 of the body 345. Therefore, in the present embodiment, the shaft member 70 can be attached after the intermediate member 160 is combined with the body 345. Therefore, it is possible to carry out the assembly work more easily and with increased productivity. In addition, the detachment work of only the shaft member 70 is also further facilitated. Accordingly, the reuse is also facilitated. Particularly, in this case, it is not necessary to deform the shaft member 70 during the insertion and the detachment. Accordingly, there is no more possibility of damage. In addition, since the detachment is facilitated, the workability can also be improved.

As described above, the shaft member 70 is combined with the intermediate member 160 of the bearing member 341 according to the present embodiment, thereby configuring an end member. Then, even in this end member, the intermediate member 160 is held by the guide surfaces 351 and 352 formed in the body 345 so as not to slip out, and the shaft member 70 is held by the intermediate member 160 so as not to slip out. Therefore, the shaft member 70 is not directly held by the body 345. Then, the end member in which the shaft member 70 is combined with the bearing member 341 can also be operated similar to the above-described end member 140.

Figure 32:
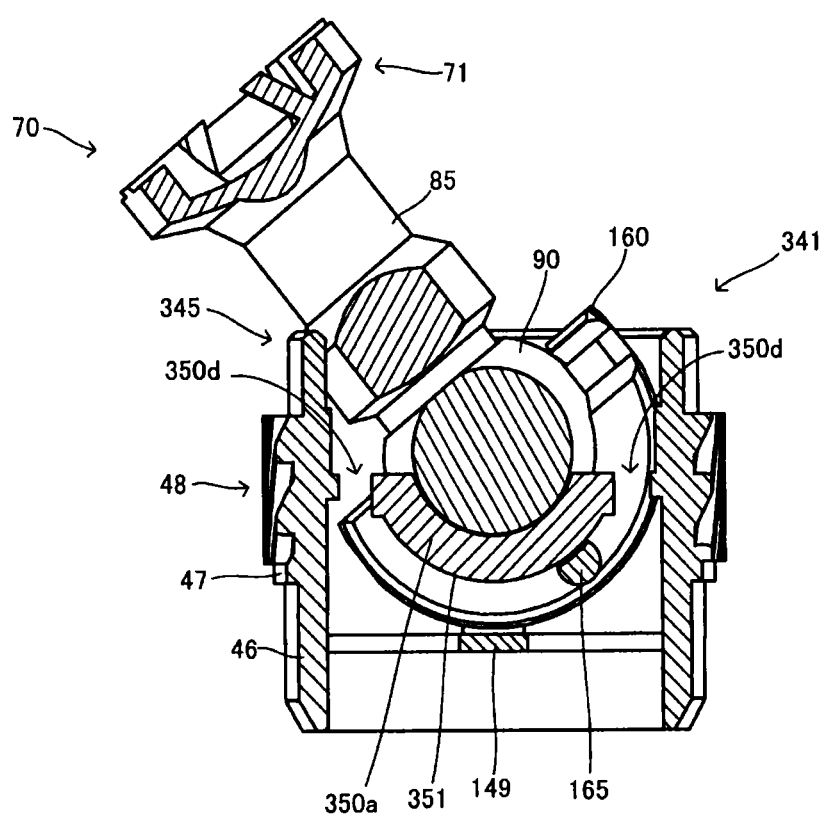
FIG. 32 is a view for describing tilting of the shaft member 70 and a position of a guide member 165.

FIG. 32 is a cross-sectional view illustrating a scene in which the shaft member 70 is combined with the bearing member 341 and the shaft member 70 is most tilted. As is understood from FIG. 32, even when the shaft member 70 is tilted, the rotary shaft 85 of the shaft member 70 comes into contact with the body 345 of the bearing member 341 before the guide member 165 reaches the guide member insertion groove 350d. Accordingly, the shaft member 70 is no longer tilted. Therefore, there is no possibility that the intermediate member 160 slips out from the body 345. In addition, even when the shaft member 70 is pulled, the guide member 165 cannot reach the guide member insertion groove 350d. Therefore, unintentional detachment does not occur.

Then, in a swing range of the shaft member 70, when the guide member 165 of the intermediate member 160 moves along the guide surfaces 351 and 352, the guide member 165 is not caught on by the guide member insertion groove 350d. Accordingly, the smooth movement is allowed.

Figure 33A:
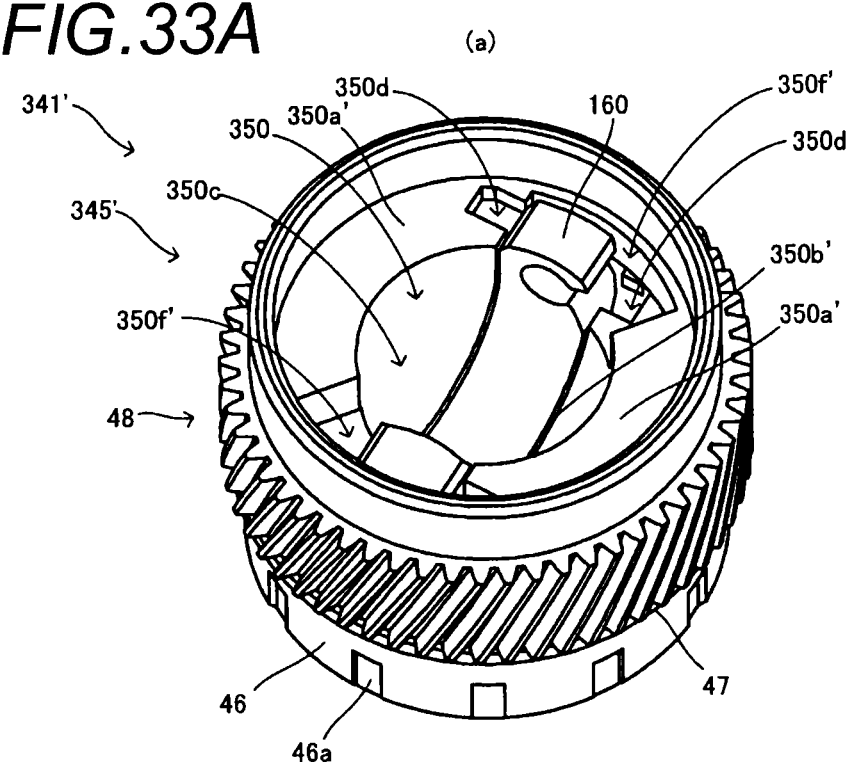
FIG. 33A is a perspective view of a bearing member 341'.
Figure 33B:
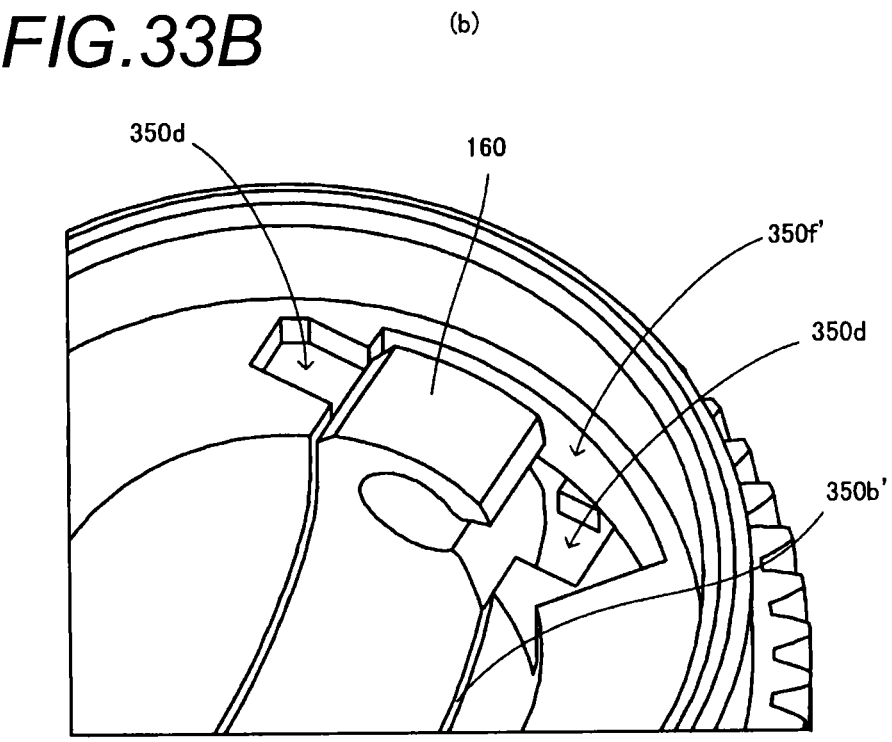
FIG. 33B is a perspective view illustrating an enlarged portion of the bearing member 341'.

FIGS. 33A and 33B are views for describing a bearing member 341' having a body 345' according to a modification example of the body 345. FIG. 33A is a perspective view of the bearing member 341', and FIG. 33B is an enlarged view of a portion in FIG. 33A. In the present example, when both ends of the intermediate member 160 adopt a posture of being arrayed side by side in the direction orthogonal to the axis of the body 345' (radial direction of the body 345'), a projection 350a' extends in the direction along the axis so that even the end portion of the intermediate member 160 is hidden inside a groove 350b'. However, a portion of the projection 350a' is cut out and a space 350f is formed so that the shaft member 70 can be engaged with the grooves 161 and 162 of the intermediate member 160. The projection 350a' is formed so as to lead to the grooves 161 and 162 of the intermediate member 160 from the space 350f.

Figure 34:
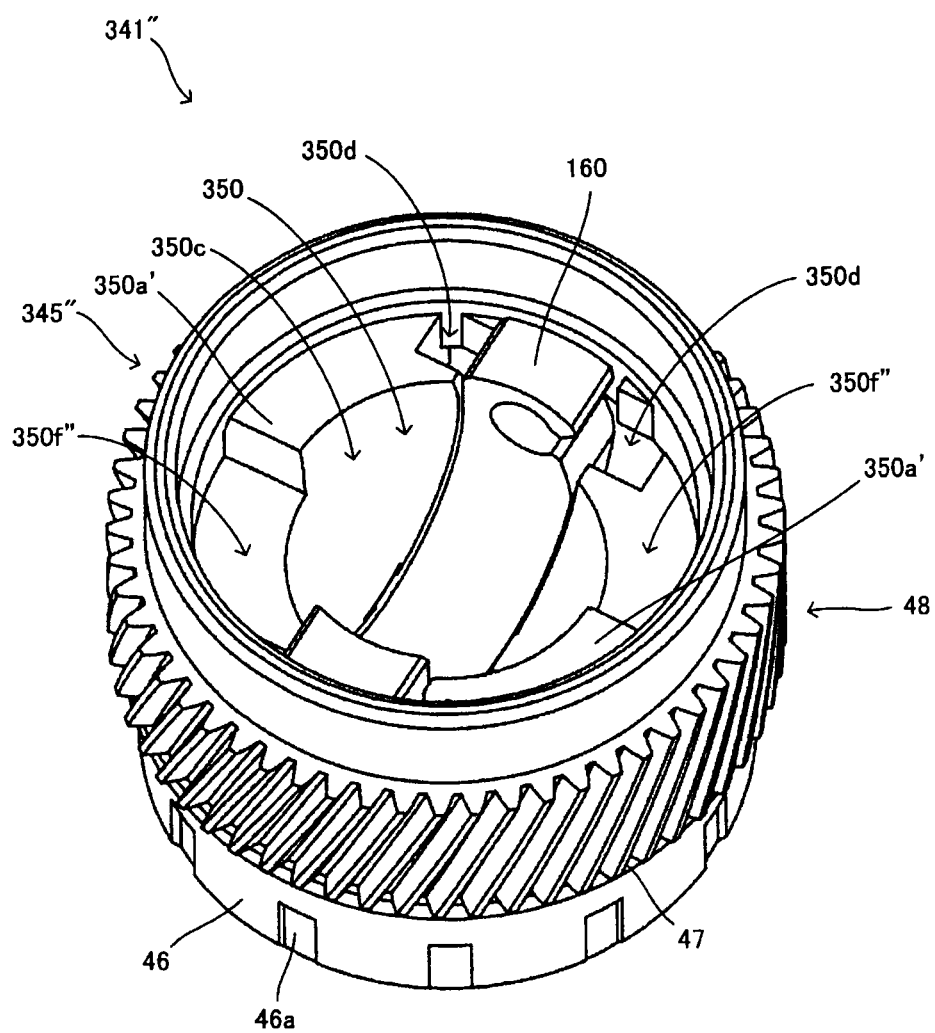
FIG. 34 is a perspective view of the bearing member 341".

FIG. 34 is a view for describing a bearing member 341" having a body 345" according to another modification example of the body 345. FIG. 34 is a perspective view of the bearing member 341". In the present example, a space 350f" which is larger than the space 350f of the body 345' is formed.

According to the bodies 345' and 345", the spaces 350f and 350f" ensure that the shaft member 70 is easily attached and detached, and can increase a contact portion between the intermediate member 160 and the bodies 345' and 345" on the opposite side of the spaces 350f and 350f". Therefore, it is possible to disperse a load during rotation.

Next, a fifth embodiment will be described. In the fifth embodiment, a holding portion 450 of a body 445 is different from that according to the above-described fourth embodiment, and a guide member 465 of an intermediate member 460 is different from that according to the above-described fourth embodiment. Other elements can be similarly considered, and thus, the body 445 and the intermediate member 460 will be described here by focusing on elements which are different from those in the fourth embodiment. Then, the same reference numerals are given to those which are considered to be the same as the members and elements which have been described hitherto, and description thereof will be omitted.

Figure 35A:
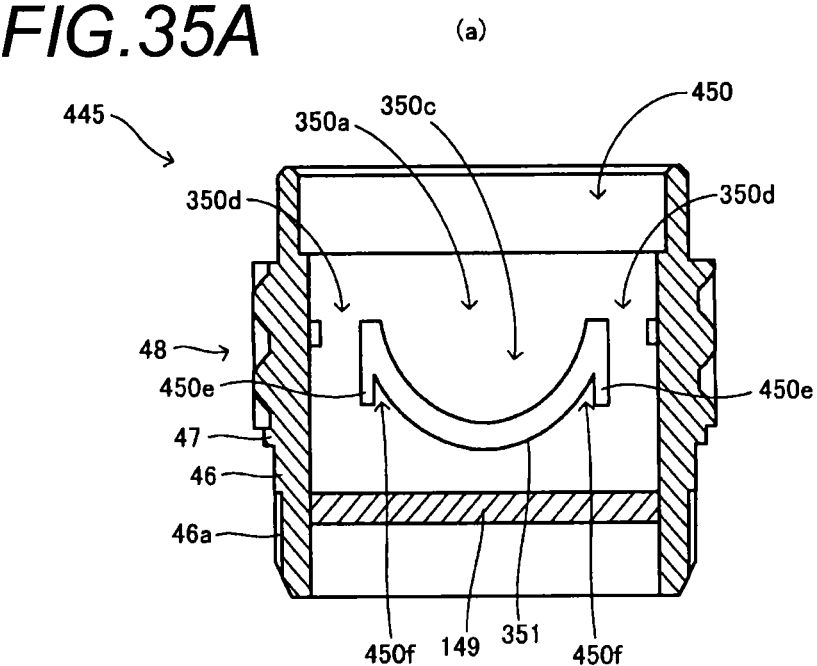
FIG. 35A is a cross-sectional view of a body 445.
Figure 35B:
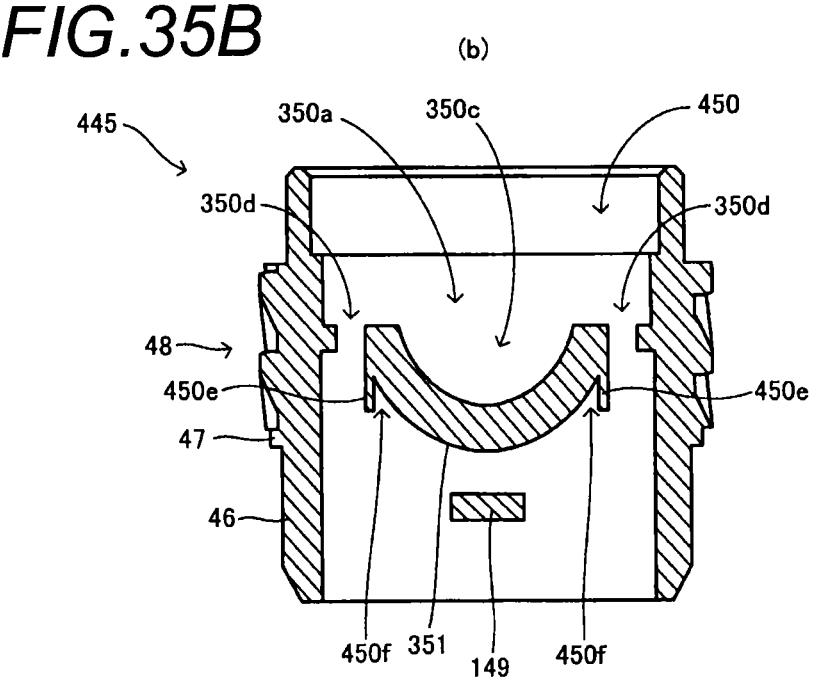
FIG. 35B is another cross-sectional view of the body 445.

FIGS. 35A and 35B illustrate a view for describing the body 445. FIG. 35A is a view illustrated by using the same viewpoint in FIG. 28A, and FIG. 35B is a view illustrated by using the same viewpoint in FIG. 28B. In addition, FIG. 36A illustrates a perspective view of the intermediate member 460, FIG. 36B illustrates a front view of the intermediate member 460, and FIG. 36C illustrates a plan view of the intermediate member 460, respectively.

As is understood from FIGS. 35A and 35B, similar to the holding portion 350, the guide member insertion groove 350d is also disposed in the holding portion 450 included in the body 445. In the holding portion 450, a return piece 450e extending to the guide surfaces 351 and 352 side (bottom portion 149 side) is arranged from an edge continuous with the guide surface 351 within an edge of the guide member insertion groove 350d. This causes an internal corner portion 450f which is open to the guide surfaces 351 and 352 side to be formed between the return piece 450e and the guide surfaces 351 and 352. Then, the internal corner portion 450f does not appear when the guide member insertion groove 350d is viewed from the concave portion 350c side.

Figure 36A:
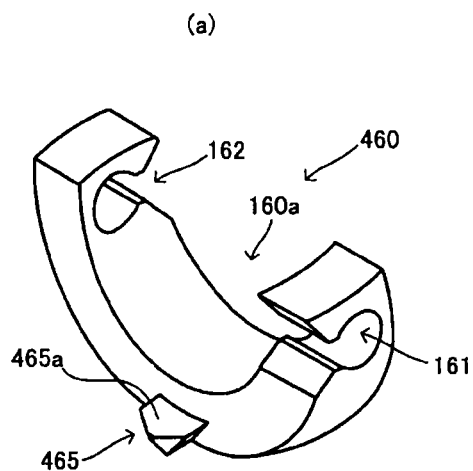
FIG. 36A is a perspective view of an intermediate member 460.
Figure 36B:
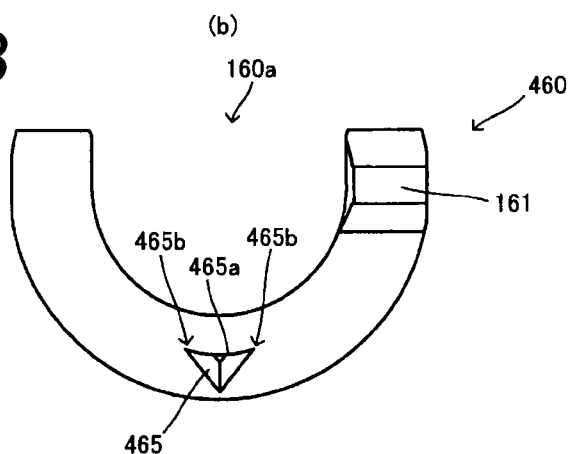
FIG. 36B is a front view of the intermediate member 460.
Figure 36C:
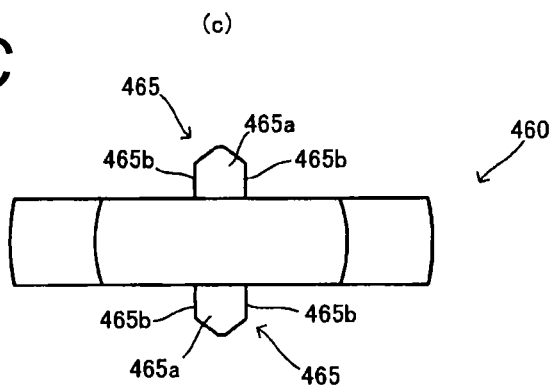
FIG. 36C is a plan view of the intermediate member 460.

In contrast, as is understood from FIGS. 36A to 36C, a guide member 465 (guided portion) whose shape is different from that in the intermediate member 160 is disposed in the intermediate member 460. That is, in the present embodiment, the guide member 465 has a substantially triangular column shape, and a distal end thereof is tapered in a cone shape.

Therefore, projections 465b having apexes of a triangle in both ends of a surface 465a in contact with the guide surfaces 351 and 352 of the holding portion 450 are formed in the guide member 465.

Figure 37A:
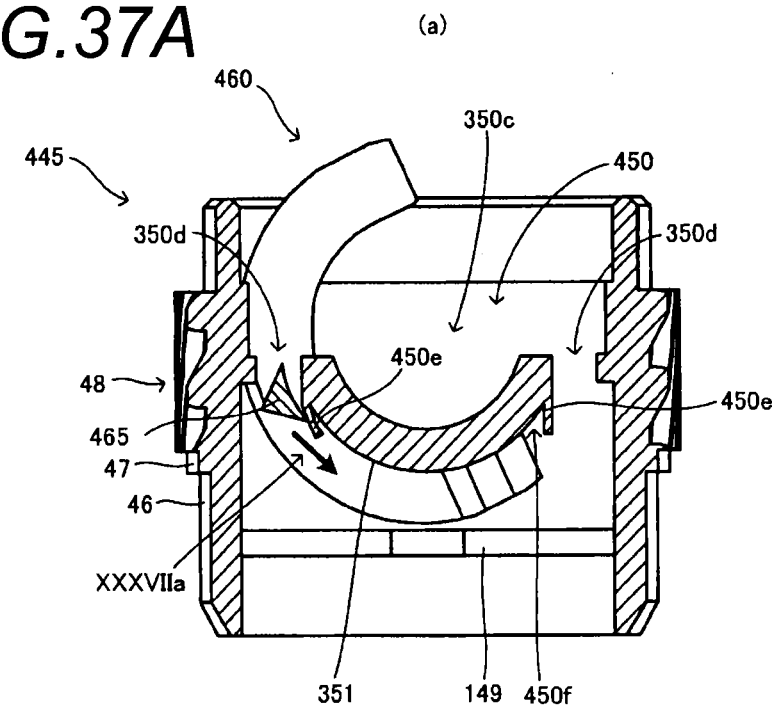
FIG. 37A is a view for describing a scene where the intermediate member 460 is attached to the body 445, and FIG.
Figure 37B:
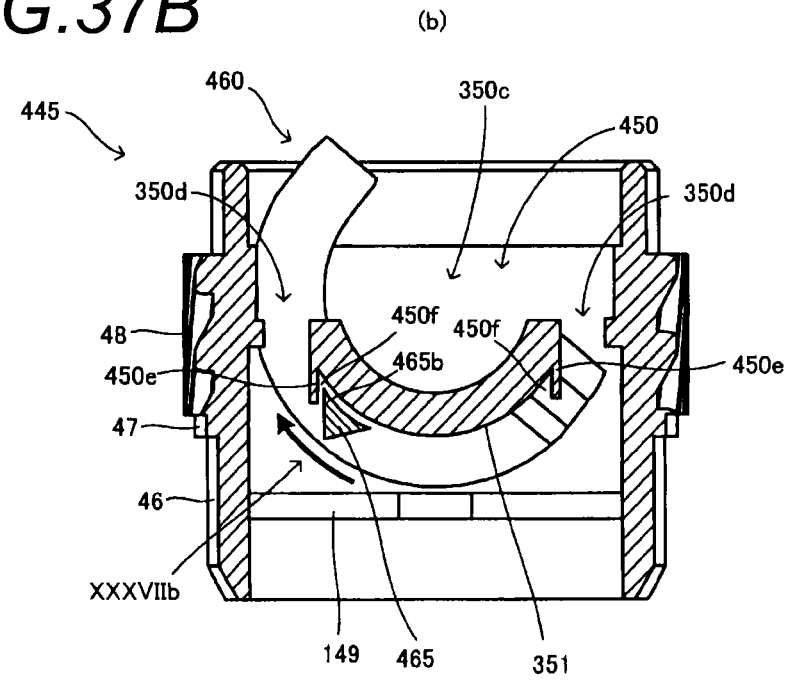

According to the above-described configuration, the intermediate member 460 is further less likely to slip out from the body 445 after the intermediate member 460 is combined with the body 445. FIGS. 37A and 37B illustrate views for the description. FIG. 37A illustrates a cross-sectional view of a scene where the intermediate member 460 is combined with the body 445, and FIG. 37B illustrates a cross-sectional view of a scene where swing of the shaft member 70 causes the intermediate member 460 to swing together, respectively.

First, a scene is considered where the intermediate member 460 is attached to the body 445. In the scene, as illustrated by arrow XXXVIa in FIG. 37A, the guide member 465 of the intermediate member 460 is arranged on the guide surfaces 351 and 352 side by penetrating the guide member insertion groove 350d from the concave portion 350c side. In this case, as described above, the return piece 450e causes the internal corner portion 450f to be oriented so as not to interfere with the insertion of the guide member 465. Therefore, the intermediate member 460 can be attached to the body 445 smoothly as usual.

Next, a scene is considered where the shaft member 70 and the intermediate member 460 swing after the intermediate member 460 and the shaft member 70 are attached to the body 445. In the scene, as illustrated by arrow XXXVIIb in FIG. 37B, the guide member 465 of the intermediate member 460 is guided and moved by the guide surface 351 of the body 445. In this case, if the swing becomes large and the guide member 465 reaches the return piece 450e, the projection 465b of the guide member 465 enters the internal corner portion 450f formed by the guide surfaces 351 and 352 and the return piece 450e. Therefore, the guide member 465 can no longer move. Accordingly, there is no possibility that the guide member 465 slips out from the guide member insertion groove 350d.

As described above, according to the present embodiment, there is provided a function as the above-described end member. The attachment work between the intermediate member 460 and the body 445 can be smoothly carried out. Furthermore, it is possible to more reliably prevent the intermediate member 460 from slipping out from the body 445 unintentionally. For example, even when the body 445 and the intermediate member 460 are transported in an assemble state, there is no possibility that vibrations generated during the transport cause the intermediate member 460 to slip out therefrom.

In the present embodiment, the guide member 465 of the intermediate member 460 is configured to have the triangular column shape as described above, thereby showing a shape in which the guide member 465 is likely to enter the internal corner portion 450f. However, the shape of the guide member is not particularly limited as long as the shape of the guide member regulates the movement (rotation) by the guide member entering the internal corner portion.

Hitherto, embodiments and examples have been described in which all the described end members are arranged in the end portion of the photosensitive drum 35 and the photosensitive drum unit is formed according to this configuration. In contrast, as described with reference to FIG. 2, the process cartridge additionally includes the developing roller unit having the columnar rotary body or the charging roller unit. Therefore, all the end members according to the above-described embodiments and modification examples can be applied to the developing roller unit or the charging roller unit, instead of being arranged in the photosensitive drum. In this manner, the developing roller unit or the charging roller unit can receive the rotation driving force from the apparatus body. As one embodiment, FIG. 38 illustrates a developing roller unit 523 including the end member 40. FIG. 38 also illustrates a perspective view of the developing roller unit 523 and a photosensitive drum unit 530 which is arranged to be adjacent thereto.

The developing roller unit 523 includes a developing roller 524, a spacer ring 525, a lid member 526, a magnetic roller (not illustrated), and the end member 40. The end member 40 is configured as described above. In addition, those which are known can be applied to other members, but other members include the following configurations, for example.

The developing roller 524 is a member in which an outer peripheral surface of a columnar rotary body is coated with a developer layer. In the present embodiment, the developing roller 524 is a conductive cylinder made of aluminum, and is configured so that a material configuring the developer layer is applied thereto.

The spacer ring 525 is an annular member which is arranged so as to wind around each outer peripheral surface in both ends of the developing roller 524, thereby holding a constant gap between the developing roller 524 and the photosensitive drum 35. The thickness of the spacer ring 525 is approximately 200 μm to 400 μm.

Similar to the above-described lid member 36, the lid member 526 is a bearing which is arranged on one end side of the developing roller 524, and which causes the developing roller 524 to be rotated around the axis in one end of the developing roller unit 523.

The magnetic roller is arranged inside the developing roller 524, and thus is not illustrated in FIG. 38. However, the magnetic roller is a roller formed of a magnetic material or a resin containing the magnetic material, and multiple magnetic poles are arranged along the axis. In this manner, it is possible to deposit a developer on a surface of the developing roller 524 by using a magnetic force.

The end member 40 is configured as described above, but is arranged in an end portion opposite to the end portion in which the lid member 526 is arranged within the end portion of the developing roller 524. Herein, an example of applying the end member 40 has been described. However, without being limited thereto, any other end member already described above can also be applied.

In this case, for example, the photosensitive drum unit 530 can be configured as follows. That is, the photosensitive drum unit 530 includes the photosensitive drum 35, and lid members 36 and 540 which serve as a bearing for rotating the photosensitive drum 35 around the axis in each portion of both ends of the photosensitive drum 35. In this case, one lid member 540 includes a gear portion 541 which meshes with a gear 48 of the end member 40 arranged in the developing roller unit 523 and receives the rotation force.

As described above, each end member may be a configuring member included in the developing roller unit. In this case, the end member is also operated similarly to when included in the photosensitive drum unit.

According to the present invention, there are provided a bearing member, an end member, a photosensitive drum unit, a developing roller unit, a process cartridge, an intermediate member, and a bearing member body which ensure sufficiently smooth swing of a shaft member.

Hereinafter, some aspects of the present invention will be described. Here, for ease of understanding, reference numerals in the drawings are given in parentheses, but the present invention is not limited thereto.

The present invention includes a bearing member (41, 141) configured to be arranged in an end portion of a columnar rotary body (35, 524), wherein a shaft member (70) is attachable to the bearing member, the bearing member including: a body (45, 145) that includes a cylindrical body (46) and a holding portion (50, 150) which is arranged inside the cylindrical body; and an intermediate member (60, 160, 260) that is held by the holding portion of the body, wherein the holding portion includes an intermediate member guide (51, 52, 53, 54, 151, 152) which guides the intermediate member so that the intermediate member rotates, and the intermediate member includes a portion in which the shaft member is arranged.

Here, the "columnar rotary body" is a general idea including a rotary body which has a solid round bar shape and rotates around an axis line, and a rotary body which has a cylindrical hollow shape and rotates around an axis line.

In an aspect of the bearing member (41) according to the present invention, the intermediate member guide (51, 52, 53, 54) is a guide groove into which an outer peripheral portion of the intermediate member is inserted, wherein the guide groove slides and guides the outer peripheral portion, and at least a portion on a bottom surface of the guide groove is a curved surface.

In an aspect of the bearing member (41) according to the present invention, the curved surface on the bottom surface of the guide groove (51, 52, 53, 54) comes into contact with the outer peripheral portion of the intermediate member (60), thereby regulating a movement in a direction along an axis of the cylindrical body (46) of the intermediate member.

In an aspect of the bearing member (141) according to the present invention, a protruding guide member (165) is disposed in the intermediate member (160, 260), the intermediate member guide (151, 152) is a guide surface on which the guide member slides, and at least a portion of the guide surface is a curved surface.

In an aspect of the bearing member (141) according to the present invention, a guide member insertion groove (150*d*, 350*d*) is disposed in the holding portion (150) for causing the guide member (165) to reach the guide surface (151, 152).

In an aspect of the bearing member (141) according to the present invention, the guide member insertion groove includes a snap-fit structure which is a portion narrower than an outer shape of the guide member.

In an aspect of the bearing member (141) according to the present invention, a groove (261, 262) into which a portion of a shaft member (70) is inserted is disposed in the intermediate member (260), and the groove includes a snap-fit structure (261*a*, 262*a*) which is a portion narrower than an outer shape of the inserted portion of the shaft member.

In an aspect of the bearing member (141) according to the present invention, the snap-fit structure of the guide member insertion groove (150*d*) can be disengaged with a force weaker than a force for the snap-fit structure (261*a*, 262*a*) of the groove (261, 262) disposed in the intermediate member (260).

In an aspect of the bearing member (141) according to the present invention, the snap-fit structure of the guide member insertion groove (150*d*) needs to be disengaged with a force stronger than a force for the snap-fit structure (261*a*, 262*a*) of the groove (261, 262) disposed in the intermediate member (260).

An end member (40, 140) according to the present invention includes: a shaft member (70); and the bearing member (41, 141), wherein the shaft member includes: a rotary shaft (85); a rotation force receiving portion (71) which is included on one end side of the rotary shaft, which can engage with a rotation force applying portion of an image forming apparatus body, and which receives a rotation force from a drive shaft by maintaining an engaging posture thereof; a proximal end portion (90) which is arranged on the other end side of the rotary shaft; and a rotation force transmission projection (95) which projects from the proximal end portion, wherein a groove (61, 62, 161, 162, 261, 262) with which the rotation force transmission projection engages is disposed in the intermediate member, and the shaft member is assembled to the intermediate member by the rotation force transmission projection engaging with the groove.

A photosensitive drum unit (30) according to the present invention is configured such that the columnar rotary body is a photosensitive drum (35), and the photosensitive drum unit includes the photosensitive drum and the end member (40, 140) which is arranged in at least one end portion of the photosensitive drum.

A developing roller unit (523) according to the present invention is configured such that the columnar rotary body is a developing roller (524), and the developing roller unit includes the developing roller and the end member (40) which is arranged in at least one end portion of the developing roller.

A process cartridge (20) according to the present invention includes: a housing (21); and the photosensitive drum unit (30) according to claim 11 which is held in the housing.

A process cartridge according to the present invention includes: a housing; and the developing roller unit which is held in the housing.

An intermediate member (60, 160, 260) according to the present invention is configured to be included in a bearing member (41, 141) which is arranged in an end portion of a columnar rotary body (35, 524) and to which a shaft member (70) is attached, wherein the intermediate member is configured to be arranged between a body (45, 145) of the bearing member and the shaft member (70), the intermediate member including: a portion in which the shaft member is arranged so as to be swingable; and a guided portion which is guided by a portion of the body so that the intermediate member is swingable with respect to the body.

A body (45, 145) of a bearing member according to the present invention is configured to be included in the bearing member (41, 141) configured to be arranged in an end portion of a columnar rotary body (35, 524) and to attach a shaft member (70) to the bearing member, wherein the shaft member is attached to the body via an intermediate member (60, 160, 260), the body of the bearing member including: a cylindrical body (46); and a holding portion (50, 151) that is arranged inside the cylindrical body and holds the intermediate member so as to be swingable, wherein the holding portion includes an intermediate member guide (51, 52, 53, 54, 151, 152) which guides the intermediate member so that the intermediate member rotates.

What is claimed is:

1. A bearing member configured to be arranged in an end portion of a columnar rotary body, wherein a shaft member is attachable to the bearing member, the bearing member comprising:
    a body that includes a cylindrical body and a holding portion which is arranged inside the cylindrical body; and
    an intermediate member that is held by the holding portion of the body, wherein
    the holding portion includes an intermediate member guide which guides the intermediate member so that the intermediate member rotates,
    the intermediate member includes a portion in which the shaft member is arranged,
    the intermediate member further comprises a protruding guide member disposed therein, and
    the intermediate member guide is a guide surface on which the guide member slides, and at least a portion of the guide surface is a curved surface,
    wherein
    a guide member insertion groove is disposed in the holding portion for causing the guide member to reach the guide surface,
    the guide member insertion groove includes a snap-fit structure which is a portion narrower than an outer shape of the guide member,
    a groove into which a portion of a shaft member is inserted is disposed in the intermediate member, and
    the groove includes a snap-fit structure which is a portion narrower than an outer shape of the inserted portion of the shaft member.

2. The bearing member according to claim 1, wherein
    the intermediate member guide is a guide groove into which an outer peripheral portion of the intermediate member is inserted, wherein the guide groove slides and guides the outer peripheral portion, and
    at least a portion on a bottom surface of the guide groove is a curved surface.

3. The bearing member according to claim 2, wherein
    the curved surface on the bottom surface of the guide groove comes into contact with the outer peripheral portion of the intermediate member, thereby regulating a movement in a direction along an axis of the cylindrical body of the intermediate member.

4. The bearing member according to claim 1, wherein
    the snap-fit structure of the guide member insertion groove can be disengaged with a force weaker than a force for the snap-fit structure of the groove disposed in the intermediate member.

5. The bearing member according to claim 1, wherein
    the snap-fit structure of the guide member insertion groove needs to be disengaged with a force stronger than a force for the snap-fit structure of the groove disposed in the intermediate member.

6. An end member comprising:
    a shaft member; and
    the bearing member according to claim 1, wherein
    the shaft member includes:
    a rotary shaft;
    a rotation force receiving portion which is included on one end side of the rotary shaft, which can engage with a rotation force applying portion of an image forming apparatus body, and which receives a rotation force from a drive shaft by maintaining an engaging posture thereof;
    a proximal end portion which is arranged on the other end side of the rotary shaft; and
    a rotation force transmission projection which projects from the proximal end portion, wherein
    a groove with which the rotation force transmission projection engages is disposed in the intermediate member, and
    the shaft member is assembled to the intermediate member by the rotation force transmission projection engaging with the groove.

7. A photosensitive drum unit, wherein
    the columnar rotary body is a photosensitive drum, and
    the photosensitive drum unit includes the photosensitive drum and the end member according to claim 6 which is arranged in at least one end portion of the photosensitive drum.

8. A developing roller unit, wherein
    the columnar rotary body is a developing roller, and
    the developing roller unit includes the developing roller and the end member according to claim 6 which is arranged in at least one end portion of the developing roller.

9. A process cartridge comprising:
    a housing; and
    the photosensitive drum unit according to claim 7 which is held in the housing.

10. A process cartridge comprising:
    a housing; and
    the developing roller unit according to claim 8 which is held in the housing.

* * * * *